United States Patent
Maimone et al.

(10) Patent No.: US 10,996,476 B2
(45) Date of Patent: May 4, 2021

(54) METHOD TO REDUCE DIFFRACTION ARTIFACTS IN A WAVEGUIDE DISPLAY AND DISPLAY USING THE SAME

(71) Applicant: Facebook Technologies, LLC, Menlo Park, CA (US)

(72) Inventors: Andrew Maimone, Menlo Park, CA (US); Oleg Yaroshchuk, Menlo Park, CA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/509,124

(22) Filed: Jul. 11, 2019

(65) Prior Publication Data

US 2021/0011290 A1 Jan. 14, 2021

(51) Int. Cl.
- *G02B 27/01* (2006.01)
- *F21V 8/00* (2006.01)
- *G09G 3/00* (2006.01)

(52) U.S. Cl.
CPC ....... *G02B 27/0172* (2013.01); *G02B 6/0016* (2013.01); *G02B 6/0035* (2013.01); *G09G 3/001* (2013.01); *G02B 2027/012* (2013.01); *G02B 2027/0178* (2013.01); *G09G 2320/0247* (2013.01)

(58) Field of Classification Search
CPC ................ G02B 6/0035; G02B 6/0016; G02B 27/0172; G02B 2027/012; G09G 3/001; G09G 2320/0247
See application file for complete search history.

(56) References Cited

U.S. PATENT DOCUMENTS

| | | | |
|---|---|---|---|
| 8,233,204 B1* | 7/2012 | Robbins | G02B 27/0149 359/15 |
| 10,353,203 B2* | 7/2019 | Cai | G02B 27/0172 |
| 2001/0024177 A1 | 9/2001 | Popovich | |
| 2010/0188488 A1* | 7/2010 | Birnbaum | H04N 21/47 348/53 |
| 2013/0234935 A1 | 9/2013 | Griffith | |

(Continued)

OTHER PUBLICATIONS

Abhishek Srivastava, et al., Ferroelectric liquid crystals: Excellent tool for modern displays and photonics, Journal of the SID, 23(6), 2015, pp. 253-272.

(Continued)

*Primary Examiner* — Ryan A Lubit
(74) *Attorney, Agent, or Firm* — Millburn IP PLLC

(57) ABSTRACT

An optical device with reduced see-through diffraction artifacts for Augmented Reality (AR) applications is provided. The device includes a projector configured to generate an image light and a waveguide optically coupled with the projector and configured to guide the image light to an eye-box. The waveguide includes an in-coupling element configured to couple the image light into the waveguide, and an out-coupling element configured to decouple the image light out of the waveguide. The waveguide includes at least one switchable grating configured to: during a virtual-world subframe of a display frame, decouple the image light out of the waveguide via diffraction, and during a real-world subframe of the display frame, transmit a light from a real-world environment to the eye-box with a diffraction efficiency less than a predetermined threshold.

20 Claims, 12 Drawing Sheets

(56) References Cited

U.S. PATENT DOCUMENTS

| | | | |
|---|---|---|---|
| 2015/0125109 A1* | 5/2015 | Robbins | G02B 27/01 385/10 |
| 2016/0209657 A1* | 7/2016 | Popovich | A61B 3/113 |
| 2018/0188542 A1* | 7/2018 | Waldern | G02B 27/0172 |
| 2018/0210146 A1* | 7/2018 | Klug | G02B 6/122 |
| 2018/0284884 A1* | 10/2018 | Sulai | G02F 1/011 |
| 2018/0364486 A1* | 12/2018 | Ding | G02B 6/0026 |
| 2019/0197994 A1* | 6/2019 | Kunitomo | G06F 3/1423 |
| 2019/0265476 A1* | 8/2019 | Blum | G02B 27/0149 |
| 2020/0026074 A1* | 1/2020 | Waldern | G02B 27/0172 |
| 2020/0150424 A1* | 5/2020 | Browy | G02B 27/288 |

OTHER PUBLICATIONS

Rumiko Yamaguchi, et al., Electro-optical Properties and Morphology of Reverse Scattering Mode TN LCD, Journal of Photopolymer Science and Technology, vol. 25, No. 3, 2012, pp. 313-316.

P.J.W. Hands, et al., Phase modulation with polymer-dispersed liquid crystals, Advanced Wavefront Control: Methods, Devices, and Applications III, vol. 5894, 2005, International Society for Optics and Photonics.

Jonathan D. Waldern, et al., DigiLens switchable Bragg grating waveguide optics for augmented reality applications, Digital Optics for Immersive Displays, Proc. SPIE, vol. 10676, May 21, 2018.

Doane, J. W., "Polymer-Dispersed Liquid Crystals: Boojums at Work," Materials Research Society Bulletin, 16, pp. 22-28, Jan. 1991 (7 pages).

Glushchenko A., et al., "Memory effect in filled nematic liquid crystals," Liquid Crystals, vol. 23, No. 2, pp. 241-246, 1997 (6 pages).

Yaroshchuk, O. V., et al., "Electro-optics and structural peculiarities of liquid crystal-nanoparticle-polymer composites," Physical Review, E 72, pp. 051715-1 to 051715-11, 2005 (11 pages).

International Search Report and Written Opinion dated Oct. 2, 2020, in International Application No. PCT/US2020/041041, filed Jul. 7, 2020 (13 pages).

* cited by examiner

1100

During a virtual-world frame of an image frame of a projector, switching on the projector to generate an image light and switching at least one switchable grating to decouple the image light out of a waveguide to an eye-box via diffraction ~ 1110

During a real-world frame of the image frame of the display, switching off the projector and switching the at least one switchable grating to transmit a light from a real world to the eye-box with a diffraction efficiency lower than a predetermined threshold ~ 1120

FIG. 11

METHOD TO REDUCE DIFFRACTION ARTIFACTS IN A WAVEGUIDE DISPLAY AND DISPLAY USING THE SAME

BACKGROUND

Augmented Reality (AR) headsets display a virtual image overlapping with real-world images or see-through images. Pupil-expansion waveguide displays with diffractive coupling structures are one of the most promising designs for AR displays, potentially offering sun/eye-glasses form factors, a moderately large field of view (FOV), and a large eye-box. One of the key challenges of these designs are see-through artifacts, for example, diffractive structures cause rainbow effects in the see-through view, especially when a user wearing the AR headset looks at a bright light source from certain angles. The diffractive structures are often optimized to maximize the quality of a see-through image, which may sacrifice the quality or light efficiency of a virtual image.

BRIEF SUMMARY OF THE DISCLOSURE

One aspect of the present disclosure provides an optical device. The optical device includes a projector configured to generate an image light and a waveguide optically coupled with the projector and configured to guide the image light to an eye-box. The waveguide includes an in-coupling element configured to couple the image light into the waveguide, and an out-coupling element configured to decouple the image light out of the waveguide. The waveguide includes at least one switchable grating configured to: during a virtual-world subframe of a display frame, decouple the image light out of the waveguide via diffraction, and during a real-world subframe of the display frame, transmit a light from a real-world environment to the eye-box with a diffraction efficiency less than a predetermined threshold.

Another aspect of the present disclosure provides a method for an optical device. A display frame of a projector is divided in two subframes for sequential transmission of light from real and virtual worlds, respectively. The method includes during a virtual-world subframe of the display frame, switching on the projector to generate an image light and switching at least one switchable grating to decouple the image light out of a waveguide to an eye-box via diffraction. The method further includes during a real-world subframe of the display frame, switching off the projector from generating the image light and switching the at least one switchable grating to transmit a light from a real-world environment to the eye-box with a diffraction efficiency less than a predetermined threshold.

Other aspects of the present disclosure can be understood by those skilled in the art in light of the description, the claims, and the drawings of the present disclosure.

BRIEF DESCRIPTION OF THE DRAWINGS

The following drawings are provided for illustrative purposes according to various disclosed embodiments and are not intended to limit the scope of the present disclosure.

FIG. 11 illustrates a flow chart of a method for a NED according to an embodiment of the disclosure.

DETAILED DESCRIPTION

Figure 1A:
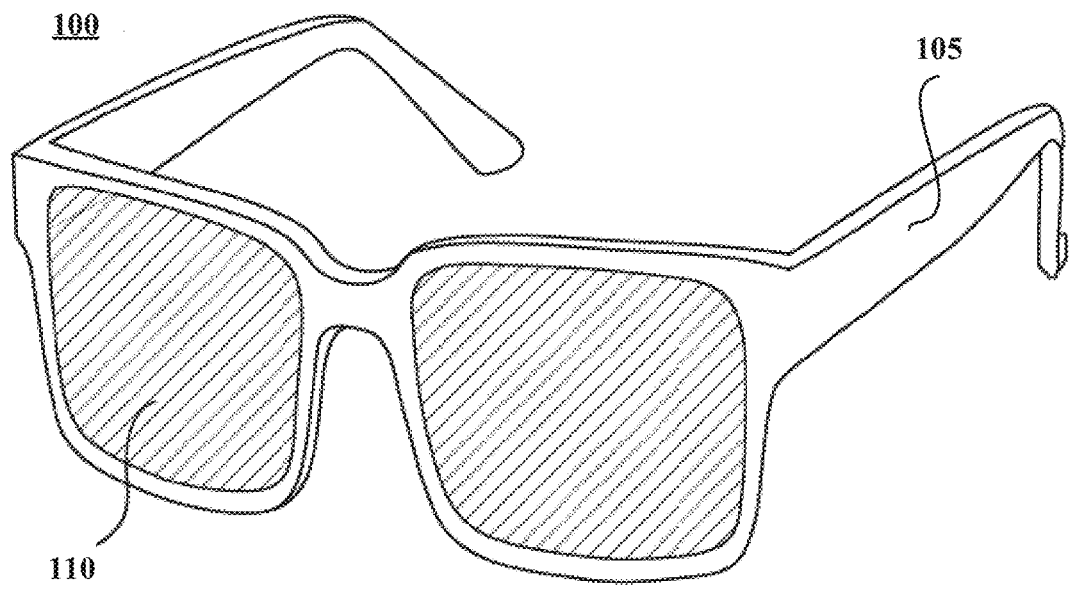
FIG. 1A illustrates a schematic diagram of a near-eye display (NED) according to an embodiment of the disclosure.

The present disclosure provides a waveguide display assembly capable of reducing the see-through artifacts, e.g., diffraction artifacts. The waveguide display assembly may be implemented into a near-eye display (NED). The waveguide display assembly may include a projector configured to generate an image light and a waveguide optically coupled with the projector and configured to guide the image light to an eye-box. The waveguide includes an in-coupling element configured to couple the image light into the waveguide, and an out-coupling element configured to decouple the image light out of the waveguide. The waveguide includes at least one switchable grating configured to: during a virtual-world subframe of a display frame, decouple the image light out of the waveguide via diffraction, and during a real-world subframe of the display frame, transmit a light from a real-world environment with a diffraction efficiency less than a predetermined threshold. In some embodiments, the predetermined threshold is about 0.5%. In some embodiments, the predetermined threshold is about 0.1%. In some embodiments, the predetermined threshold is about 0.05%. In some embodiments, the at least one switchable grating is an out-coupling grating. In some embodiments, the waveguide includes a plurality of switchable gratings each is configured to: during the virtual-world subframe of the display frame, perform at least one of directing, expanding or decoupling the image light out of the waveguide via diffraction, and during the real-world subframe of the display frame, transmit a light from a real-world environment with a diffraction efficiency less than a predetermined threshold.

During the real-world subframe, the display panel may be switched off from generating the image light and the at least one switchable grating may be switched to a non-diffracting state to transmit the light from a real-world environment with negligible diffraction, e.g., the diffraction efficiency is less than the predetermined threshold. During the virtual-world subframe, the display panel may be switched on to generate the image light, and the at least one switchable grating may be switched to a diffracting state to decouple the image light out of the waveguide via diffraction. A switching time of the virtual-world subframe and the real-world subframe may be sufficiently fast so that a user sees them combined without flicker, i.e., beyond a flicker fusion threshold. In other words, the real-world and virtual-world subframes are presented at a rate that exceeds the flicker fusion threshold of the user of the NED including the waveguide display assembly. In some embodiments, the flicker fusion threshold may be larger than or equal to about 60 Hz.

The virtual-world subframe may have a shorter duration than the real-world subframe to minimize diffraction artifacts. To further reduce or eliminate the diffraction artifacts, the display may include an optical dimmer disposed at a side of the waveguide facing the real-world environment viewed through the NED to dim (including completely block) the light from the real-world environment during the virtual-world subframe. In some embodiments, the dimmer may also dim the light from the real-world environment during the real-world subframe according to the brightness of the real-world environment. The optical dimmer may be configured to have any number of light transmittance between 0 and 100%, including 0 and 100%. That is, the optical dimmer may completely transmit or completely block the incident light.

The present disclosure also provides a method for a waveguide display assembly. A display frame of a projector may be divided in two subframes for sequential transmission of light from real and virtual worlds, respectively. The method may include during a virtual-world subframe of the display frame, switching on the projector to generate an image light and switching at least one switchable grating to a diffracting state to decouple the image light out of a waveguide to an eye-box via diffraction. The method may further include during a real-world subframe of the display frame, switching off the projector from generating the image light and switching the at least one switchable grating to a non-diffracting state to transmit a light from a real-world environment to the eye-box with a diffraction efficiency less than a predetermined threshold. In some embodiments, the predetermined threshold is about 0.1%. The duration or the time of the virtual-world subframe may be minimized in the display frame to minimize the diffraction artifacts. It may for example depend on brightness of the real-world environment. In some embodiments, the method may further include during the virtual-world subframe of the display frame, switching all switchable gratings to perform at least one of directing, expanding or decoupling the image light out of the waveguide to the eye-box via the diffraction; and during the real-world subframe of the display frame, switching all the switchable gratings to transmit the light from the real-world environment to the eye-box with the diffraction efficiency less than the predetermined threshold. In some embodiments, the method may further include switching an optical dimmer disposed at a side of the waveguide facing the real-world environment to block the light from a real-world environment during the virtual-world subframe. The method may further include switching the dimmer to dim (including completely block) the light from the real-world environment during the real-world subframe according to the brightness of the real-world environment.

FIG. 1A illustrates a schematic diagram of a near-eye display (NED) 100 according to an embodiment of the disclosure. In some embodiments, the NED 100 may be referred to as a head-mounted display (HMD). The NED 100 may present media to a user. Examples of media presented by the NED 100 include one or more images, video, audio, or some combination thereof. In some embodiments, audio is presented via an external device (e.g., speakers and/or headphones) that receives audio information from the NED 100, a console (not shown), or both, and presents audio data based on the audio information. The NED 100 acts as a virtual reality (VR) device, an augmented reality (AR) device or a mixed reality (MR) device, or some combination thereof. In some embodiments, when the NED 100 acts as an augmented reality (AR) or a mixed reality (MR) device, portions of the NED 100 and its internal components may be at least partially transparent.

As shown in FIG. 1A, the NED 100 may include a frame 105 and a display 110. Certain device(s) may be omitted, and other devices or components may also be included. The frame 110 may include any appropriate type of mounting structure to ensure the display assembly 120 to be viewed as a near-eye display (NED) by a user. The frame 105 may be coupled to one or more optical elements which together display media to users. In some embodiments, the frame 105 may represent a frame of eye-wear glasses. The display 110 is configured for users to see the content presented by the NED 100. As discussed below in conjunction with FIG. 1B, the display 110 may include at least one display assembly (not shown) for directing image light to an eye of the user.

Figure 1B:
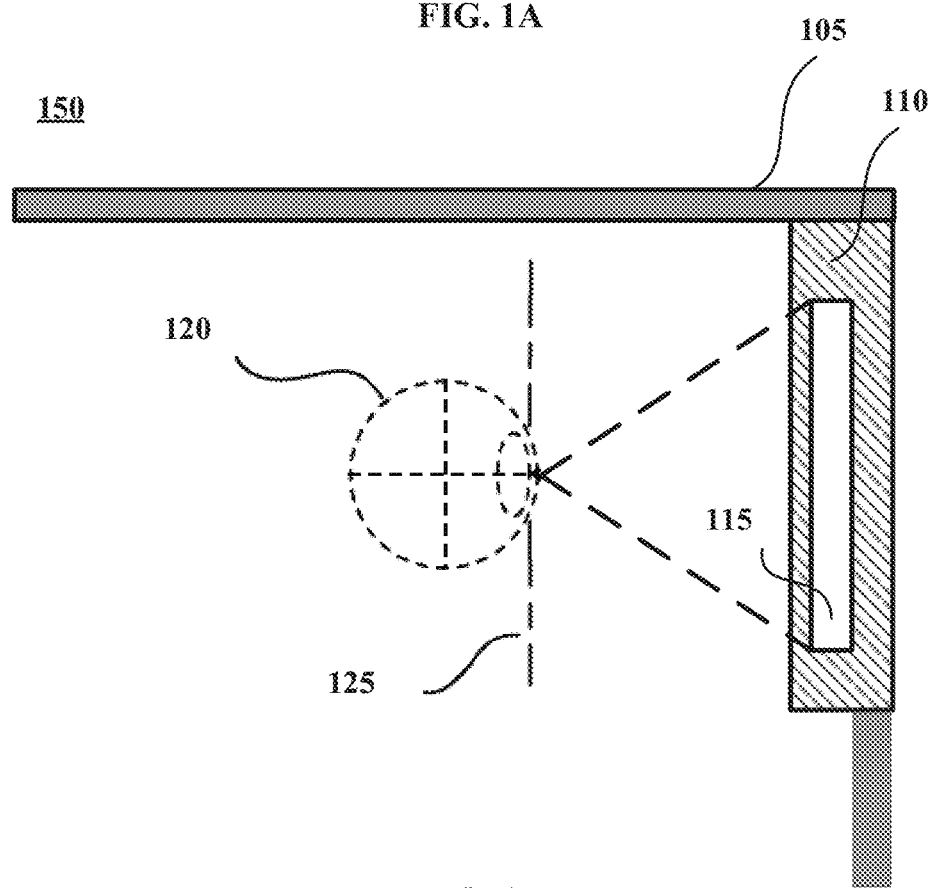
FIG. 1B illustrates a cross-section of the NED in FIG. 1A according to an embodiment of the disclosure.

FIG. 1B is a cross-section 150 of the NED 100 shown in FIG. 1A according to an embodiment of the disclosure. The display 110 may include at least one waveguide display assembly 115. An exit pupil 125 may be a location where the eye 120 is positioned in an eye-box region when the user wears the NED 100. For purposes of illustration, FIG. 1B shows the cross section 150 associated with a single eye 120 and a single waveguide display assembly 115, but in alternative embodiments not shown, another display assembly which is separate from the waveguide display assembly 115 shown in FIG. 1B, may provide image light to an eye-box located at an exit pupil of another eye of the user.

The waveguide display assembly 115, as illustrated below in FIG. 1B, is configured to direct the image light to an eye-box located at the exit pupil 125 of the eye 120. The waveguide display assembly 115 may be composed of one or more materials (e.g., plastic, glass, etc.) with one or more refractive indices that effectively minimize the weight and widen a field of view (FOV) of the NED 100. In some embodiments, the waveguide display assembly 115 may be a component (e.g., the display 110) of the NED 100. In some embodiments, the waveguide display assembly 115 may be part of some other NED, or other system that directs display image light to a particular location. As shown in FIG. 1B, the waveguide display assembly 115 may be for one eye 120 of the user. The waveguide display assembly 115 for one eye may be separated or partially separated from the waveguide display assembly 115 for the other eye. In certain embodiments, a single waveguide display assembly 115 may be used for both eyes 120 of the user.

In some embodiments, the NED 100 may include one or more optical elements between the waveguide display assembly 115 and the eye 120. The optical elements may act to, e.g., correct aberrations in image light emitted from the waveguide display assembly 115, magnify image light emitted from the waveguide display assembly 115, some other optical adjustment of image light emitted from the waveguide display assembly 115, or some combination thereof. The example for optical elements may include an aperture, a Fresnel lens, a convex lens, a concave lens, a filter, or any other suitable optical element that affects image light. Exemplary waveguide display assembly 115 will be described in detail below in conjunction with FIG. 2 and FIG. 4.

Figure 2:
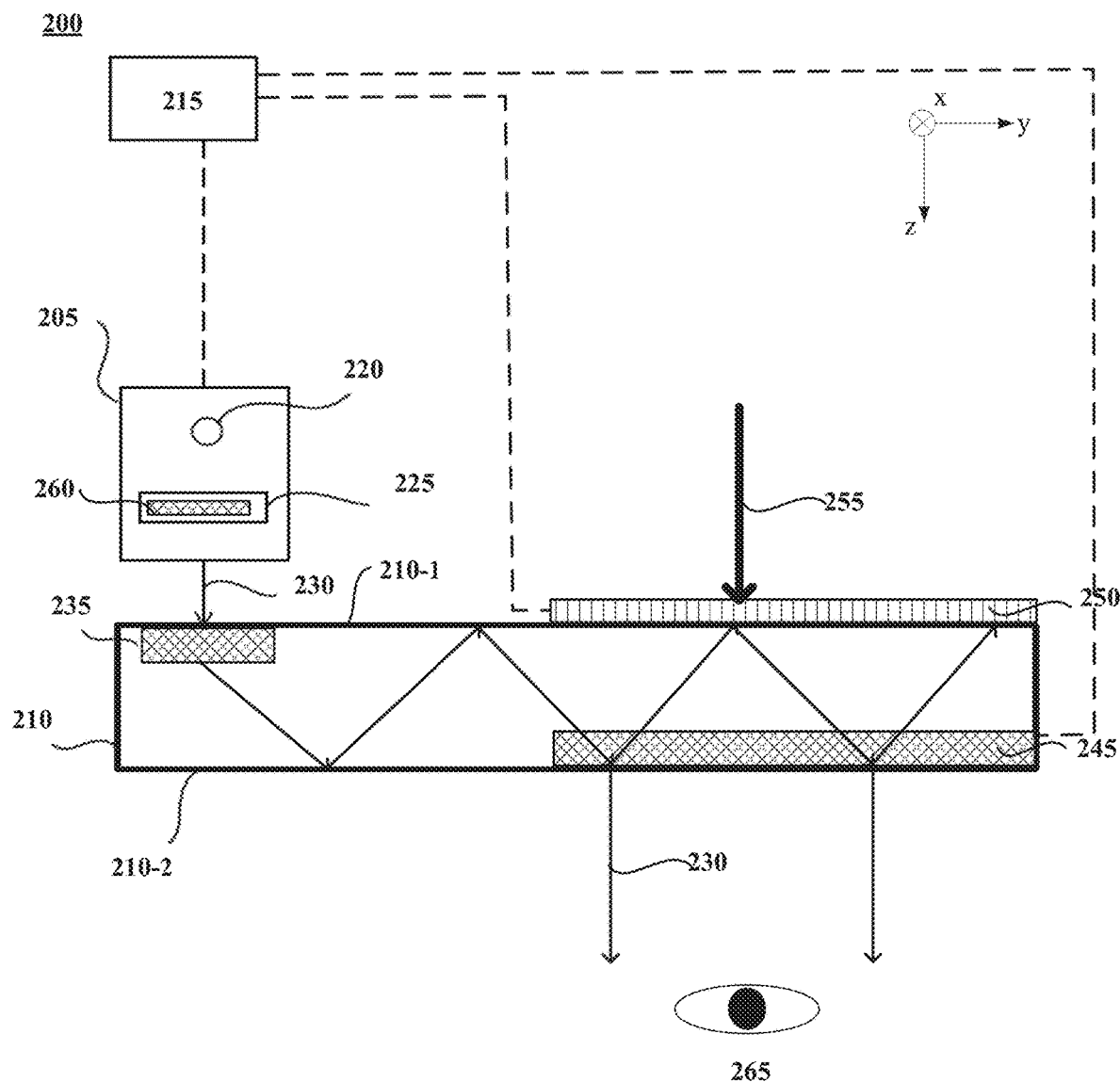
FIG. 2 illustrates a schematic diagram of a waveguide display assembly according to an embodiment of the disclosure.

FIG. 2 illustrates a schematic diagram of a waveguide display assembly 200 of the NED in FIG. 1A according to an embodiment of the disclosure. The waveguide display assembly 200 may be the waveguide display assembly 115 in FIG. 1B. As shown in FIG. 2, the waveguide display assembly 200 may include a source assembly 205, a waveguide 210, and a controller 215. The source assembly 205 may be a projector 205 that includes a source 220 and an optics system 225. The source 220 may be a light source that generates coherent or partially coherent light. The source 220 may include, e.g., a laser diode, a vertical cavity surface emitting laser, and/or a light emitting diode. In some embodiments, the source 220 may be a display panel, such as a liquid crystal display (LCD) panel, an liquid-crystal-on-silicon (LCoS) display panel, an organic light-emitting diode (OLED) display panel, a micro-LED (micro light-emitting diode) display panel, a digital light processing (DLP) display panel, or some combination thereof. In some embodiments, the source 220 may be a self-emissive panel, such as an OLED display panel or a micro-LED display panel. In some embodiments, the source 220 may be a display panel that is illuminated by an external source, such as an LCD panel, an LCoS display panel, or a DLP display panel. Examples of an external sources may include a laser, an LED, an OLED, or some combination thereof. The optics system 225 may include one or more optical components that condition the light from the source 220. Conditioning light from the source 220 may include, e.g., transmitting, attenuating, expanding, collimating, and/or adjusting orientation in accordance with instructions from the controller 215.

The projector 205 may generate image light 230 and output the image light 230 to an in-coupling element 235 located at the waveguide 210. The waveguide 210 may receive the image light 230 at one or more in-coupling elements 235, and guide received image light 230 to an out-coupling element 245 located at the waveguide 210, such that the received input image light 230 is decoupled out of the waveguide 210 via the out-coupling element 245 towards the eye 265 of the user.

The waveguide 210 may include a first surface 210-1 facing the real-world and an opposing second surface 210-2 facing the eye 265. The in-coupling element 235 may be part of, or affixed to, the first surface 210-1 or the second surface 210-2 of the waveguide 210. In some embodiments, as shown in FIG. 2, the in-coupling element 235 may be part of, or affixed to, the first surface 210-1 of the waveguide 210. In some embodiments, the in-coupling element 235 may be part of, or affixed to, the second surface 210-2 of the waveguide 210. In some embodiments, the in-coupling element 235 may include a surface relief grating, a volume hologram, a polarization grating, a polarization volume hologram, a metasurface, or other types of diffractive elements, or some combination thereof. In some embodiments, the in-coupling element 235 may include a diffraction grating, and a pitch of the diffraction grating may be chosen such that the total internal reflection occurs in the waveguide 210, and the image light 230 may propagate internally in the waveguide 210 (e.g., by total internal reflection). The in-coupling element 235 is also referred to as an in-coupling grating.

The out-coupling element 245 may be part of, or affixed to, the first surface 210-1 or the second surface 210-2 of the waveguide 210. In some embodiments, as shown in FIG. 2, the out-coupling element 245 may be part of, or affixed to, the second surface 210-2 of the waveguide 210. In some embodiments, the out-coupling element 245 may be part of, or affixed to, the first surface 210-1 of the waveguide 210. In some embodiments, the out-coupling element 245 may include a surface relief grating, a volume hologram, a polarization grating, a polarization volume hologram, a metasurface, or other types of diffractive elements, or some combination thereof. In some embodiments, the out-coupling element 245 may include a diffraction grating, and the pitch of the diffraction grating may be configured to cause the incident image light 230 to exit the waveguide 210, i.e. redirecting image light 230 so that total internal reflection no longer occurs. Such a grating is also referred to as an out-coupling grating.

In some embodiments, the waveguide display assembly 200 may include additional gratings that redirect/fold and/or expand the pupil of the projector 205, and an exemplary structure of the waveguide display assembly will be described in conjunction with FIG. 4. In some embodiments, multiple functions, e.g., redirecting/folding and/or expanding the pupil of the projector 205 may be combined into a single grating, e.g. an out-coupling grating. In some embodiments, some above-mentioned gratings may be divided in several sections (subgratings), for example for tiling field of view (FOV).

The waveguide 210 may be composed of one or more materials that facilitate total internal reflection of the image light 230. The waveguide 210 may be composed of, for example, plastic, glass, and/or polymers, or some combination thereof. The waveguide 210 may have a relatively small form factor. For example, the waveguide 210 may be approximately 50 mm wide along the x-dimension, 30 mm long along the y-dimension and 0.5-1 mm thick along the z-dimension. In some embodiments, the waveguide display assembly 200 may include a stack of waveguides, where each waveguide is designed to handle, e.g., some portion of the FOV and color spectrum of the virtual image.

The controller 215 may control the operations of the source assembly 205, and determine scanning instructions for the source assembly 205. In some embodiments, the waveguide 210 may output the expanded image light 230 to the eye 265 with a large FOV. For example, the expanded image light 230 may be provided to the eye 265 with a diagonal FOV (in x and y) of 60 degrees and or greater and/or 120 degrees and/or less. The waveguide 210 may be configured to provide an eye-box with a width of 8 mm or greater and/or equal to or less than 50 mm, and/or a height of 6 mm or greater and/or equal to or less than 20 mm.

In some embodiments, the waveguide display assembly 200 may include a plurality of source assemblies 205 and a plurality of waveguides 210. Each of the source assemblies 205 may emit a monochromatic image light of a specific wavelength band corresponding to a primary color (e.g., red, green, or blue). Each of the waveguides 210 may be stacked together with a distance of separation to output an expanded image light 230 that is multi-colored. Using the waveguide display assembly 200, the physical display and electronics may be moved to the side of the front rigid body and a fully unobstructed view of the real world may be achieved, therefore opening up the possibilities to true AR experiences.

To reduce the artifacts caused by the diffractive structures at the waveguide 210, the projector 205 may have a high turning on and off speed and, desirably, increased brightness. Such a projector is referred to as a low-persistence projector or a high-speed projector. During an operation of the waveguide display assembly 200, each frame may include two subframes: a real-world subframe and a virtual-world subframe. The projector 205 may be switched on to display a virtual image during the virtual-world subframe, and switched off to stop displaying a virtual image during the real-world subframe, in accordance with instructions from the controller 215. The switching on and off of the projector 205 may be sufficiently fast such that the real-world and virtual-world subframes are presented at a rate that exceeds a flicker fusion threshold of the user, i.e., beyond a flicker fusion threshold.

In some embodiments, the projector 205 may be switched on to display a virtual image at the beginning of the virtual-world subframe, and switched off to stop displaying the virtual image at the beginning of the real-world subframe. The projector 205 may include any appropriate projectors of fast switching, such as a DLP (digital light processing) projector, an LCoS (liquid crystal on silicon) projector (for example, ferroelectric LCoS (FLCoS) projector), a LCD (liquid crystal display) projector, an OLED (organic light-emitting diode) projector, or a micro-LED (light-emitting diode) projector, or some combination thereof. In some embodiments, the fast on/off switching of the projector 205 may be realized by using a fast-switchable light source, such as a laser, an LED, an OLED or some combination thereof.

In some embodiments, the fast on/off switching of the projector 205 may be realized by using a high-speed optical shutter to reduce the switching time of the projector 205, at an expense of light efficiency. The high-speed optical shutter may be capable of being selectively switched between an opaque state (off-state) for blocking an incident light and a transparent state (on-state) for transmitting an incident light. The switchable optical shutter may be configured to be switched between, ideally, 0 and 100% light transmittance. In some embodiments, during the real-world subframe, the high-speed optical shutter may be switched to the opaque state blocking the image light 230, and during the virtual-world subframe, the high-speed optical shutter may be switched to the transparent state transmitting the image light 230. The switching on and off of the high-speed optical shutter may be sufficiently fast such that the real-world and virtual-world subframes are presented at a rate and switch from one to another with a speed that exceeds a flicker fusion threshold of the user.

In some embodiments, the high-speed optical shutter may be disposed in front of the projector 205. In some embodiments, the high-speed optical shutter may be disposed in front of the light source 220 of the projector 205. In one embodiment, as shown in FIG. 2, the optical system 225 may include a high-speed optical shutter 260 that is disposed in front of the light source 220 and controlled by the controller 215. In some embodiments, the high-speed optical shutter 260 may be a switchable shutter having fast switching speed, for example, in the order of milliseconds (ms) or microseconds (μs). In some embodiments, the high-speed optical shutter 260 may include liquid crystal (LC) materials, which is referred to as an LC shutter. Examples of LC shutters will be described in FIGS. 5A-8B.

Further, the out-coupling element 245 may include a high-speed switchable out-coupling grating capable of being selectively switched between an on-state (or a diffracting state) having a grating effect of diffracting light and an off-state (or a non-diffracting state) that transmits light with negligible diffraction, for example, with a diffraction efficiency less than a predetermined threshold, in accordance with instructions from the controller 215. In some embodiments, the predetermined threshold may be about 0.5%. In some embodiments, the predetermined threshold may be about 0.1%. In some embodiments, the predetermined threshold may be about 0.05%. For illustrative purposes, FIG. 2 shows the waveguide 210 includes one out-coupling grating 245. In some embodiments, the waveguide 210 may include a plurality of out-coupling gratings each is capable of being selectively switched between the on-state (or the diffracting state) having a grating effect of diffracting light and the off-state (or the non-diffracting state) that transmits light with negligible diffraction, for example, with the diffraction efficiency less than the predetermined threshold.

In some embodiments, the high-speed switchable out-coupling grating may include an LC layer where the grating structures are formed. In some embodiments, the out-coupling element 245 may be switched to the on-state to diffract an incident light during the virtual-world subframe, and switched to the off-state to transmit an incident light with negligible diffraction during the real-world subframe. The switching of the out-coupling element 245 may be sufficiently fast such that the real-world and virtual-world subframes are presented at a rate that exceeds a flicker fusion threshold of the user. In some embodiments, the out-coupling element 245 may be switched to the on-state at the beginning of the virtual-world subframe, and switched to the off-state at the beginning of the real-world subframe. It should also be understood that any additional grating arranged at the waveguide 210 that are visible to the user (e.g. fold gratings, pupil expansion gratings), may also be switchable in addition to the out-coupling element 245.

During the virtual-world subframe, the out-coupling element 245 may decouple the image light 230 out of the waveguide 210 via the diffraction and, thus, the eye 265 may observe a virtual image. Meanwhile, light 255 from a real-world environment (i.e., real-world light 255) may also be diffracted by the out-coupling element 245 when the real-world light 255 could be transmitted to be incident onto the out-coupling element 245. During the real-world subframe, the real-world light 255 may be directly transmitted through the out-coupling element 245 with the negligible diffraction. When the virtual-world subframe is controlled to only last for a short period of the total frame period, the out-coupling element 245 may have a negligible impact on the see-through view, such that the see-through artifacts caused by the diffractive structures of the out-coupling element 245 at the waveguide 210 may be minimized. In some embodiments, the out-coupling element 245 may include a polarization sensitive grating, which has a grating effect of diffracting light having a first polarization direction, and no grating effect but transmitting light having a second polarization direction with the negligible diffraction.

The second polarization direction may be different from the first polarization direction. In some embodiments, the out-coupling element 245 may be configured to diffract the image light 230 and transmit the real-world light 255 with negligible diffraction, where the image light 230 and the real-world light 255 may have different polarization directions, e.g., orthogonal polarization direction. The polarization of the real-world light may, for example, be controlled with a polarizer placed at the first surface 210-1 of the waveguide 210 facing the real-world environment viewed through the NED. The real-world light 255 may become a polarized light after transmitted through the polarizer, then incident onto the waveguide 210. In some embodiments, the polarizer may be a linear polarizer. In some embodiments, the polarizer may be a circular polarizer. Further, polarization of the polarized light may change by traveling in the waveguide 210 so that a polarization correction element (e.g., an anisotropic plate disposed adjacent to the waveguide 210) may be desired. The polarization sensitive grating may be switchable or non-switchable.

When the out-coupling element 245 includes a polarization sensitive grating, during the virtual-world subframe, the out-coupling element 245 may diffract the image light 230 but transmit the real-world light 255 with negligible diffraction. During the real-world subframe, the out-coupling element 245 may not receive the image light 230, but transmit the real-world light 255 with negligible diffraction. When the display time of the virtual-world subframe is much shorter than the display time of the real-world subframe, for example, when the display time of the virtual-world subframe is 10% of the total frame period, the see-through artifacts caused by the diffractive structures of the out-coupling element 245 at the waveguide 210 may be significantly reduced. In some embodiments, each display frame may be no longer divided into the virtual-world subframe and the real-world subframe because these two operation may happen simultaneously. That is, during the total display frame, the out-coupling element 245 may diffract the image light 230 but transmit the real-world light 255 with negligible diffraction. The advantage of dividing the display frame into the virtual-world subframe and the real-world subframe is that, even when a polarizer is arranged at the first surface 210-1 of the waveguide 210 facing the real-world environment, the real-world light incident onto the polarizer at a high incident angle (e.g., larger than 60°) may be not completely polarized. A polarization component that is not perfectly absorbed by the polarizer may be incident onto and diffracted by the out-coupling element 245, resulting a rainbow effect. Exemplary high-speed switchable LC gratings and polarization sensitive gratings will be described in FIGS. 9A-10B.

Figure 3:
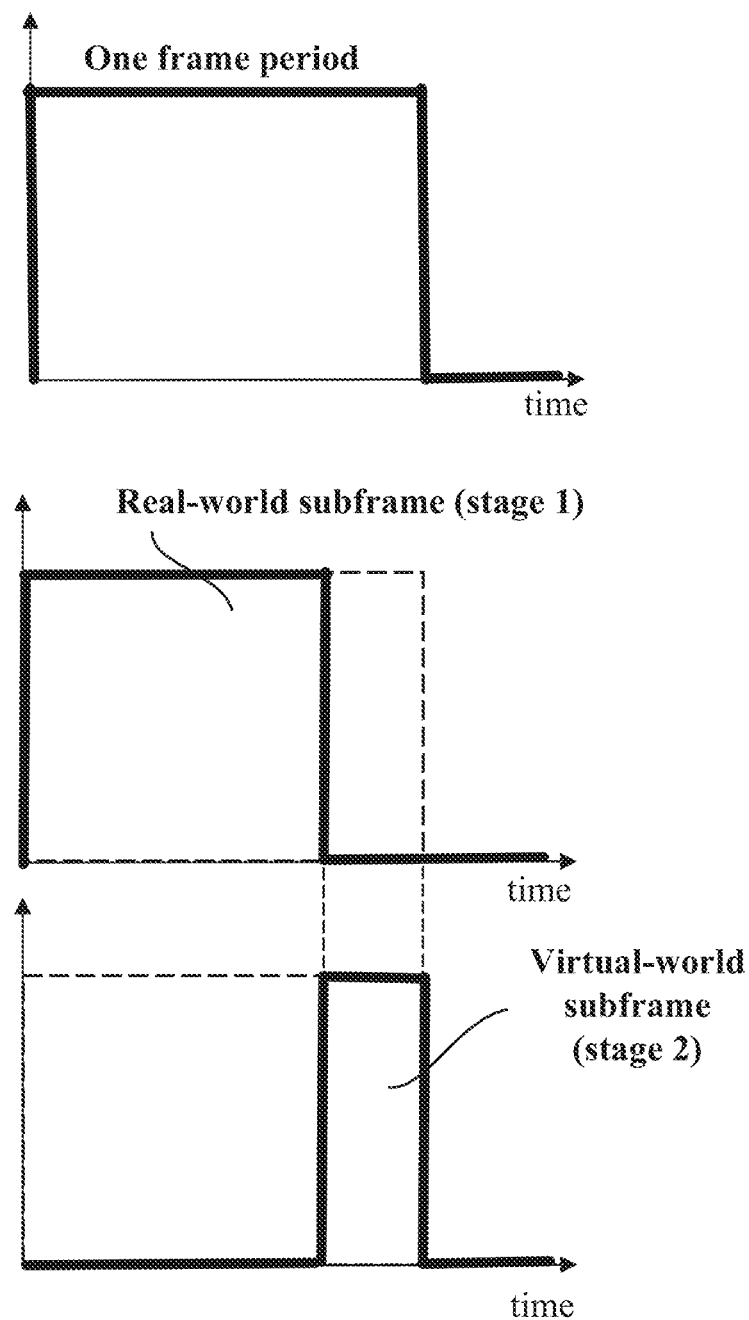
FIG. 3 illustrates an operation of the waveguide display assembly shown in FIG. 2 according to an embodiment of the disclosure.

FIG. 3 illustrates an operation of the waveguide display shown in FIG. 2 according to an embodiment of the disclosure. As shown in FIG. 3, during the operation of the waveguide display, each frame may include two subframes: a real-world subframe (stage 1) and a virtual-world subframe (stage 2). The virtual-world subframe may have a shorter duration than the real-world subframe. For example, the real-world subframe may last for 40% to 50%, 10% to 20%, or 1% to 10% of time of the total frame period, and the real-world subframe may last for 50% to 60%, 80% to 90%, or 90% to 99% time of the total frame period.

Referring to FIG. 2 and FIG. 3, during the real-world subframe (stage 1), the projector 205 may be switched to the off-state that does not display a virtual image and/or the high-speed optical shutter 260 may be switched to the opaque state to block the image light 230 and, accordingly, the out-coupling element 245 may not receive the image light 230. Meanwhile, the out-coupling element 245 may be switched to the off-state to transmit the real-world light 255 with negligible diffraction. During the virtual-world subframe (stage 2), the projector 205 may be switched to the on-state that displays a virtual image and/or the high-speed optical shutter 260 may be switched to the transparent state to transmit the image light 230 and, accordingly, the out-coupling element 245 may receive the image light 230 via the in-coupling element 235. Meanwhile, the out-coupling element 245 may be switched to the on-state to diffract both the image light 230 and the real-world light 255 incident on the out-coupling element 245, such that the image light 230 may be decoupled out of the waveguide 210 to be incident onto the eye 265, and the user may observe the virtual image.

That is, in one frame, the projector 205 may be switched on and/or the high-speed optical shutter 260 may be in the transparent state, and the out-coupling element 245 may exhibit the grating effect for a short period of the total frame period (e.g. 40% to 50%, 10% to 20%, or 1% to 10% of the total frame period) for the user to observe the virtual image, and the projector 205 may be switched off and/or the high-speed optical shutter 260 may be in the opaque state, and the out-coupling element 245 may transmit light with negligible diffraction for the remainder of the total frame period (e.g. 50% to 60%, 80% to 90%, or 90% to 99% of the total frame period) for the see-through view. Such a projector is referred to as a low persistence projector. Pulse-like operation of the low persistence projector may decrease power consumption of the NED.

For example, when a total frame period is 10 ms, the projector 205 may be switched on and/or the high-speed optical shutter 260 may be in the transparent state, and the out-coupling element 245 may exhibit the grating effect for 1 ms to 100 us for the virtual image. Thus, the out-coupling element 245 may have a negligible impact on the see-through view, and the rainbowing effects caused by the diffractive structures of the out-coupling element 245 may not be visible in the see-through view. For example, when the out-coupling element 245 exhibits the grating effect only for 10% of the total frame period (i.e., the stage 2 lasts for 10% of the total frame period), it is expected that see-through artifacts may be reduced to about 10% as compared to the situation where the out-coupling element 245 exhibits the grating effect throughout the total frame period.

In some embodiments, when the out-coupling element 245 includes a high-speed switchable grating, during the real-world subframe (stage 1), the out-coupling element 245 may be switched to the off-state (or the non-diffracting state) to transmit the real-world light 255 with negligible diffraction. During the virtual-world subframe (stage 2), the out-coupling element 245 may be switched to the on-state (or the diffracting state) to diffract both the image light 230 and the real-world light 255. In some embodiments, when the out-coupling element 245 includes a polarization sensitive grating, during the real-world subframe (stage 1), the out-coupling element 245 may be configured to receive the real-world light 255 having the second polarization direction and transmit the real-world light 255 with negligible diffraction. During the virtual-world subframe (stage 2), the out-coupling element 245 may be configured to receive both the image light 230 having the first polarization direction and the real-world light 255 having the second polarization direction, and diffract the image light 230 but transmit the real-world light 255 with negligible diffraction. The polarization of the real-world light 255 may be controlled by disposing a linear polarizer at the first surface 210-1 of the waveguide 210. In some embodiments, each display frame may be no longer divided into the virtual-world subframe and the real-world subframe because these two operation may happen simultaneously. That is, during the total frame period of the display frame, the out-coupling element 245 may diffract the image light 230 but transmit the real-world light 255 with negligible diffraction. Thus, the see-through artifacts caused by the diffractive structures of the out-coupling element 245 at the waveguide 210 may be significantly reduced.

Referring to FIG. 2, in some embodiments, in addition to the out-coupling element 245, the in-coupling element 235 may also include a grating similar to the out-coupling element 245. The grating may be a high-speed switchable grating that exhibits a grating effect for a short period of the total frame. The in-coupling element 235 may be periodically switched off and on together with the out-coupling element 245, in accordance with instructions from the controller 215. The details may be referred to the out-coupling element 245 and are not repeated herein.

In some embodiments, the waveguide display assembly 200 may further include a high-speed optical dimmer 250 disposed at the first side 210-1 of the waveguide 210, i.e., a side facing the real-world environment. In some embodiments, the dimmer 250 may be activated to block the see-through view when the out-coupling element 245 exhibits the grating effect, through which the see-through artifacts may be reduced to nearly 0% at the expense of a see-through attenuation. For example, in the real-world subframe that lasts for 90% of the total frame period, the dimmer 250 may be switched to the transparent state to transmit the real-world light 255, and in the virtual-world subframe that lasts for 10% of the total frame period, the dimmer 250 may be switched to the opaque state to block the real-world light 255, such that the see-through artifacts may be almost eliminated at the expense of a 10% reduction of the see-through brightness. However, the dark background in case of see-though attenuation may increase contrast of virtual images demonstrated in this subframe. In addition, the use of the dimmer 250 may also allow optimizing the grating structures for a virtual image, rather than finding a trade-off between the diffraction of the virtual image and the see-through view quality (including minimization of rainbow) for real world light. In some embodiments, the dimmer 250 may adaptively dim an incident light, i.e., the dimmer 250 may function as a controllable dimming element rather than a shutting element with only two transmittance states. The attenuation provided by the dimmer 250 may be controlled by, for example, an external electric field, a magnetic field, or light or some combination thereof. Exemplary high-speed optical shutters or dimmers will be described in FIGS. 5A-8B.

Figure 4:
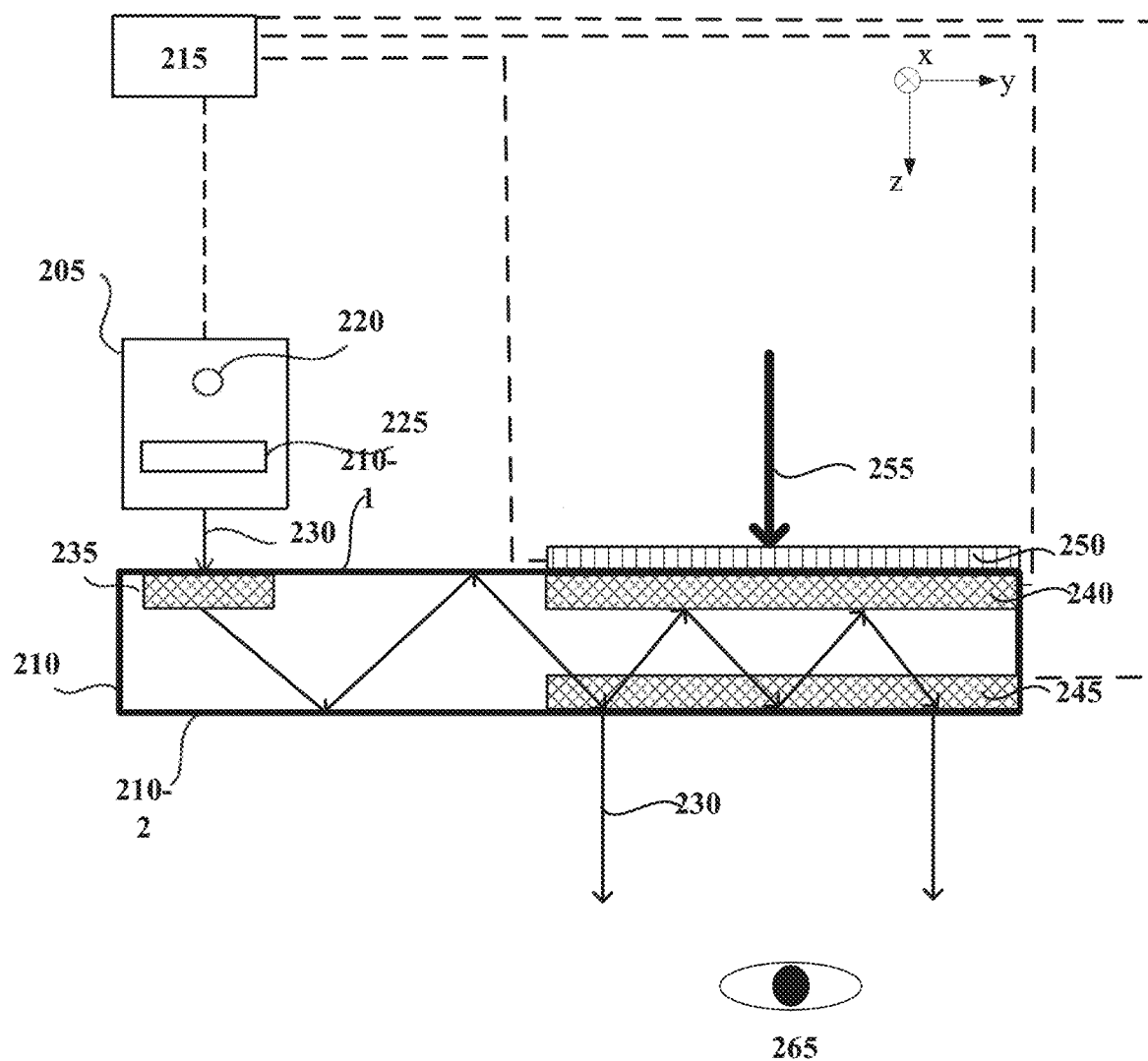
FIG. 4 illustrates a schematic diagram of another waveguide display assembly according to an embodiment of the disclosure.

FIG. 4 illustrates a cross-section of another waveguide display assembly 400 according to an embodiment of the disclosure. The similarities between FIG. 4 and FIG. 2 are not repeated, while certain differences may be explained. In some embodiments, as shown in FIG. 4, the waveguide display assembly 400 may further include a directing element 240 that redirects the received input image light 230 to the out-coupling element 245, such that the received input image light 230 is decoupled out of the waveguide 210 via the out-coupling element 245. The directing element 240 may be part of, or affixed to, the first side 210-1 of the waveguide 210. The out-coupling element 245 may be part of, or affixed to, the second side 210-2 of the waveguide 210, such that the directing element 240 is arranged opposed to the out-coupling element 245.

In some embodiments, the directing element 240 and the out-coupling element 245 may be structurally similar. The directing element 240 may include a surface relief grating, a volume hologram, a polarization grating, a polarization volume hologram, a metasurface, or other types of diffractive elements or some combination thereof. In some embodiments, the directing element 240 may be a diffraction grating, and in this case the directing element 240 is also referred to as a folding grating. In some embodiments, the waveguide display assembly 400 may include the directing element 240 but not include the out-coupling element 245, and the directing element 240 may be disposed at the first surface 210-1 or the second surface 210-2 of the waveguide 210. In this case, the directing element 240 may function similarly to the out-coupling element 245 in FIG. 2, i.e., the directing element 240 may cause light to exit the waveguide 210.

In some embodiments, similar to the out-coupling element 245, the directing element 240 may also include a high-speed switchable grating capable of being selectively switched between an on-state (or a diffracting state) having a grating effect of diffracting incident light and an off-state (or a non-diffracting state) transmitting incident light with negligible diffraction, in accordance with instructions from the controller 215. In some embodiments, similar to the out-coupling element 245, the directing element 240 may also include a polarization sensitive grating, which has a grating effect of diffracting incident light having a first polarization direction, and no grating effect but transmitting incident light having a second polarization direction different from the first polarization direction. When the directing element 240 includes a high-speed switchable grating c, the directing element 240 may be periodically switched off and on together with the out-coupling element 245. Similar to the out-coupling element 245, the grating effect of the directing element 240 may be configured to last for a short period of the total frame period during the operation of the display assembly 400. Thus, the directing element 240 may also have a negligible impact on the see-through view, such that the see-through artifacts caused by the diffractive structures of the directing element 240 at the waveguide 210 may be suppressed. The details may be referred to the out-coupling element 245 and are not repeated herein.

For illustrative purposes, FIG. 2 and FIG. 4 shows the projector 205, the out-coupling element 245, the dimmer 250, the directing element 240, and the in-coupling element 235 may be all controlled by the controller 215. In some embodiments, the projector 205, the out-coupling element 245, the dimmer 250, the directing element 240, and the in-coupling element 235 may be controlled by individual controllers, or some of them may share a controller, which is not limited by the present disclosure.

Further, in addition to the diffractive components at the waveguide display assembly 400 (e.g., the out-coupling element 245, the directing element 240, the in-coupling element 235, which are referred to as waveguide gratings), the NED may also include other diffractive components such as eye tracking combiner, accommodation lenses, etc., which may also cause rainbow artifacts that is not so strong as the waveguide gratings. In some embodiments, to maximally suppress the rainbow artifacts caused by the diffractive components, all these elements (all diffractive components, projector and optical shutters) may be configured to be switchable, for example, switched to the on-state during the virtual-world subframe and switched to the off-state during the real-world subframe. In some embodiments, a switching of all diffractive elements, projector and shutters may be desired be sufficiently fast such that the real-world and virtual-world subframes are presented at a rate that exceeds a flicker fusion threshold of the user, i.e., beyond a flicker fusion threshold.

In some embodiments, to suppress the rainbow artifacts caused by the diffractive components, among all diffractive components, projector and optical shutters, at least the projector 205 and the out-coupling element 245 may be switched to the on-state during the virtual-world subframe and switched to the off-state during the real-world subframe. In some embodiments, a switching of the projector 205 and the out-coupling element 245 may be sufficiently fast such that the real-world and virtual-world subframes are presented at a rate that exceeds a flicker fusion threshold of the user, i.e., beyond a flicker fusion threshold. In some embodiments, the out-coupling element 245 and an optical shutter capable of reducing the switching time of the projector 205 may be configured to be switched on and switched off in a sufficiently fast way such that the real-world and virtual-world subframes are presented at a rate that exceeds a flicker fusion threshold of the user, i.e., beyond a flicker fusion threshold. Such a simplification is on expense of some weak rainbow artifacts caused by diffractive components other than the waveguide gratings.

In some embodiments, to suppress the rainbow artifacts caused by the diffractive components, among all diffractive components, projector and optical shutters, the projector 205, the out-coupling element 245 and the directing element 240 may be switched to the on-state during the virtual-world subframe and switched the off-state during the real-world subframe. In some embodiments, a switching of the projector 205, the out-coupling element 245 and the directing element 240 may be sufficiently fast such that the real-world and virtual-world subframes are presented at a rate that exceeds a flicker fusion threshold of the user, i.e., beyond a flicker fusion threshold. In some embodiments, the out-coupling element 245, the directing element 240, and an optical shutter capable of reducing the switching time of the projector 205 may be configured to be switched on and switched off in a sufficiently fast way such that the real-world and virtual-world subframes are presented at a rate that exceeds a flicker fusion threshold of the user, i.e., beyond a flicker fusion threshold. Such a simplification is on expense of some weak rainbow artifacts caused by diffractive components other than the waveguide gratings.

In the following, exemplary high-speed switchable LC shutters will be explained. Switchable LC shutters may be divided into different categories based on operation principle, such as an LC shutter based on polarization, an LC shutter based on absorption, an LC shutter based on scattering, and an LC shutter based on scattering and absorption, etc.

An LC shutter based on polarization may be simply a liquid crystal display (LCD) that has a single large cell or "pixel" that covers the entire display area. The shutter may be simply "open" (in a transparent state) or "closed" (in an opaque state). The shutter may be switched between its open and closed state by applying a simple square wave drive voltage. Examples of LC shutters based on polarizations may include a nematic LC shutter, a ferroelectric LC (FLC) shutter, a guest-host LC shutter, a polymer stabilized blue phase LC (BPLC) shutter, etc. A nematic LC shutter having a normal twist nematic LC (TNLC) cell may be only switched at a rate of about 90 to 100 Hz. For faster switching rates up to about 1000 Hz, a special type of LC cell called a Pi-cell may be used in the LC shutter. The name of Pi-cell comes from the twist of LC molecules, which is 180° formed by the parallel alignment directions on two opposite substrates sandwiching an LC layer. The fast speed is the result of fluid dynamics. When the voltage is removed from a Pi-cell operated at a relative high voltage state (e.g., a homeotropic state), the LC molecules may feel very little torque to return to their low voltage state (e.g., a bend state). In the operation of the Pi-cell, a "holding" voltage at the desired low voltage state may be desired to maintain pure polarization switching, and the Pi-cell is operated between a high voltage state (e.g., about 10V) and a low holding voltage state (e.g., about 2V) with fast switching speed in the order of milliseconds (ms). In addition, the Pi-cell may have naturally high viewing angles due to the symmetrical LC molecules alignment at surface boundaries. High contrast is easily achieved with a compensation film to subtract residual birefringence at the surfaces.

Figure 5A:
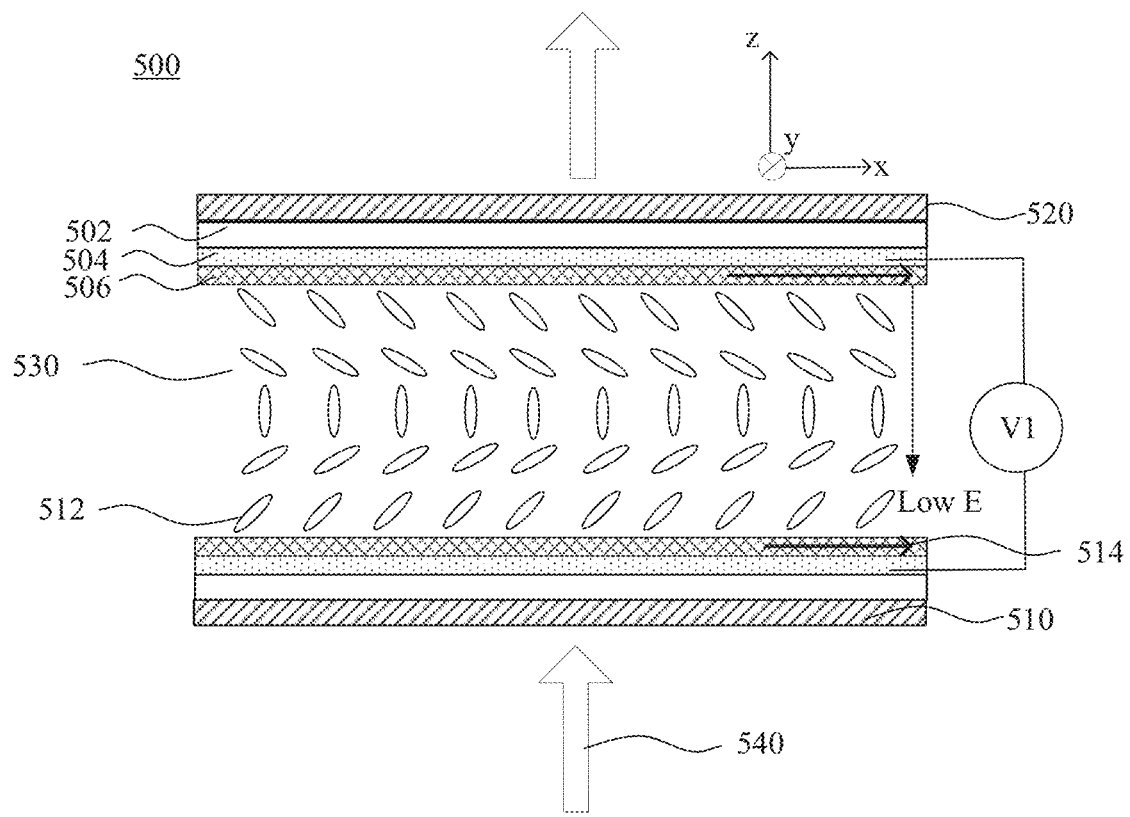
FIGS. 5A-5B illustrate a schematic diagram of an optical shutter based on polarization according to an embodiment of the disclosure.
Figure 5B:
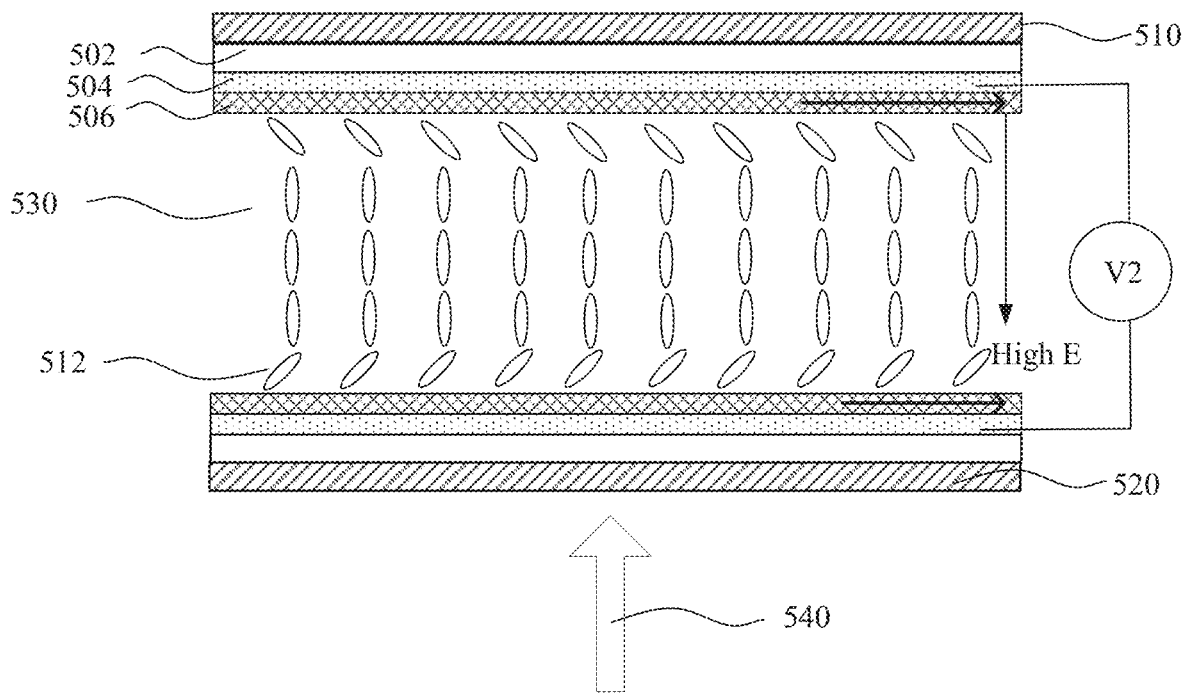

FIGS. 5A-5B illustrates a schematic diagram of a Pi-cell LC shutter 500 according to an embodiment of the disclosure. As shown in FIG. 5A, the Pi-cell LC shutter 500 may include a first linear polarizer 510 that is referred to as a polarizer, a second linear polarizer 520 that is referred to as an analyzer, and an LC cell 530 sandwiched between the polarizer 510 and the analyzer 520. The polarizer 510 and the analyzer 520 may be crossed linear polarizers, i.e., a transmission axis of the polarizer 510 may be arranged orthogonal to a transmission axis of the analyzer 520. The transmission axes of the polarizer 510 and the analyzer 520 may be disposed at angles of plus or minus 35° to 55° with respect to an alignment direction of the LC cell 530. In some embodiments, the transmission axes of the polarizer 510 and the analyzer 520 may be disposed at angles of plus or minus 45° with respect to an alignment direction of the LC cell 530.

The LC cell 530 may include upper and lower substrates 502 arranged opposite to each other. The substrates 502 may be substantially transparent in the visible band (about 380 nm to about 700 nm). In some embodiments, the substrates 502 may also be transparent in some or all of the infrared (IR) band (about 700 nm to about 1 mm). The substrates 502 may include a suitable material that is substantially transparent to the light of above-listed wavelengths range, e.g., glass, plastic, sapphire, etc. A conductive electrode 504 such as an indium tin oxide (ITO) electrode may be disposed on opposing surfaces of the substrates 502 to apply an electric field to the LC cell 530.

An alignment layer 506 may be disposed on opposing surfaces of the electrodes 504, and an LC layer including nematic LC molecules 512 may be sandwiched between the two alignment layers 506. The two alignment layers 506 may be configured with a homogeneous parallel alignment direction, for example, in an x-direction indicated by an arrow 514, through which the nematic LC molecules 512 near the upper and lower substrates 502 may be oriented in a parallel direction. The directors of the LC molecules 512 may be twisted by 180° one substrate to the other, formed by the parallel alignment direction (e.g., parallel rubbing direction) on each substrate 502. As a comparison, in a TNLC cell, the alignment directions on two substrates are perpendicular to each other and, thus, a 90° twist of LC directors from one substrate to the other is formed inside the TNLC cell.

When a relatively low electric field is applied (e.g., when a relatively low voltage $V_1$ (e.g., $V_1=2V$) is applied), as shown in FIG. 5A, the LC cell 500 may be operated at a bend state in which the LC molecules 512 at the middle of the LC layer are reoriented by the electric field E to be perpendicular to the substrates 502, while other LC molecules 512 are still oriented parallel to the alignment direction 512 because of the surface constraints. In some embodiments, a polarization direction of an incident light 540 may be parallel to the transmission axis of the polarizer 510. After propagating through the LC cell 530, the polarization direction of the incident light 540 may be rotated by 90° to be parallel to the transmission axis of the analyzer 520, such that the incident light 540 may be transmitted through the analyzer 520, realizing a transparent state of the LC shutter 500.

When a relatively high electric field is applied (e.g., when a relatively high voltage $V_2$ (e.g., $V_2=10V$) is applied), as shown in FIG. 5B, the LC cell 530 may be switched to a homeotropic state, in which the majority of the LC molecules 512 are reoriented by the electric field E to be perpendicular to the substrates 502. After propagating through the LC cell 530, the polarization direction of the incident light 540 may substantially remain the same, which is perpendicular to the transmission axis of the analyzer 520. Thus, the incident light 540 may be blocked by the analyzer 520, realizing an opaque state of the LC shutter 500. Through switching the LC cell 530 between a relative low voltage state (e.g., a bend state) and a relative high voltage state (e.g., a homeotropic state), the Pi-cell LC shutter 500 may be switched between a transparent state (i.e., incident light is transmitted) and an opaque state (i.e., incident light is block), and the switching time may be substantially fast, e.g., in the order of millisecond (ms).

An FLC shutter could offer a superfast switching typically less than 100 microsecond (μs), excellent viewing angle and low residual retardance due to intrinsic in-plane switching behavior of the FLC molecules. The FLC shutter may include an FLC cell sandwiched between a crossed polarizer and analyzer. The FLC cell may include an FLC layer sandwiched between two opposite substrates, and each substrate may be disposed with an electrode and an alignment layer. Within the ferroelectric smectic C* phase (the symbol "*" refers to the chiral nature), FLC molecules in the FLC layer may be arranged in a layered geometry where the smectic layers are perpendicular to the substrates, and the directors of the FLC molecules may move along the surface of a cone whose axis is normal to the smectic layers and parallel to the substrates. The FLC molecules may have a helical structure with spontaneous polarization perpendicular to the FLC molecules which are tilted with respect to the normal of the smectic layers, and a tilt angle is θ. In a thin cell of surface-stabilized configuration where the thickness of the LC cell is much smaller than the helix pitch, the helixes of the FLC may be unwound and, thus, resulting in a net spontaneous polarization. Such a FLC mode is known as surface stabilized (SSFLC) mode. In some embodiments, the thickness of LC layer is comparable with helix pitch, the complete suppression of helical structure may be achieved only when the electric field is applied. Such a FLC mode is known as electrically suppressed helix mode (ESHFLC mode). Other operation modes of FLC can be referred to the review paper [A. Srivastava et al., Journal of the SID 23/6, 253 (2015)].

Upon applying a voltage, the FLC molecules may be rotated along the cone and quickly align themselves in a state where the spontaneous polarization is parallel to the direction of the electric field. In particular, the directors of the FLC molecules may be reoriented from one final to the other when an external electric field changes its polarity. The total angle of switching equals the double tilt angle θ. In each final state, the directors of the FLC molecules may remain parallel to the substrates, thus transforming the FLC cell into a uniaxial phase plate. The maximum variation of the transmitted light intensity may be achieved when the FLC cell is placed between crossed polarizer and analyzer, and a transmission axis of the polarizer is configured to coincide with the director of FLC molecules at one of the final states so that the optical axis of the FLC layer forms angle 2θ with polarizer, which is usually designed to be close to 45°. A high speed and a high contrast light shutter may be obtained under applied electric fields of opposite polarity.

Figure 6A:
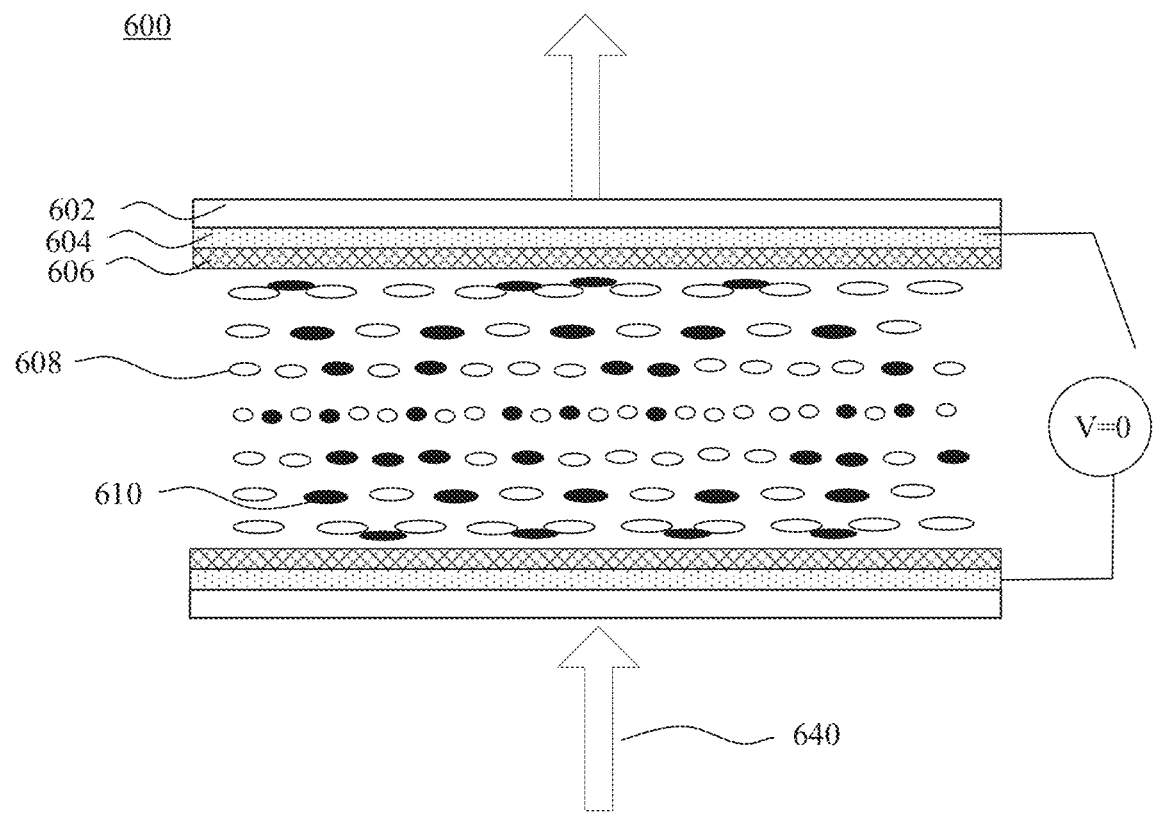
FIGS. 6A-6B illustrate a schematic diagram of another optical shutter based on absorption according to an embodiment of the disclosure.
Figure 6B:
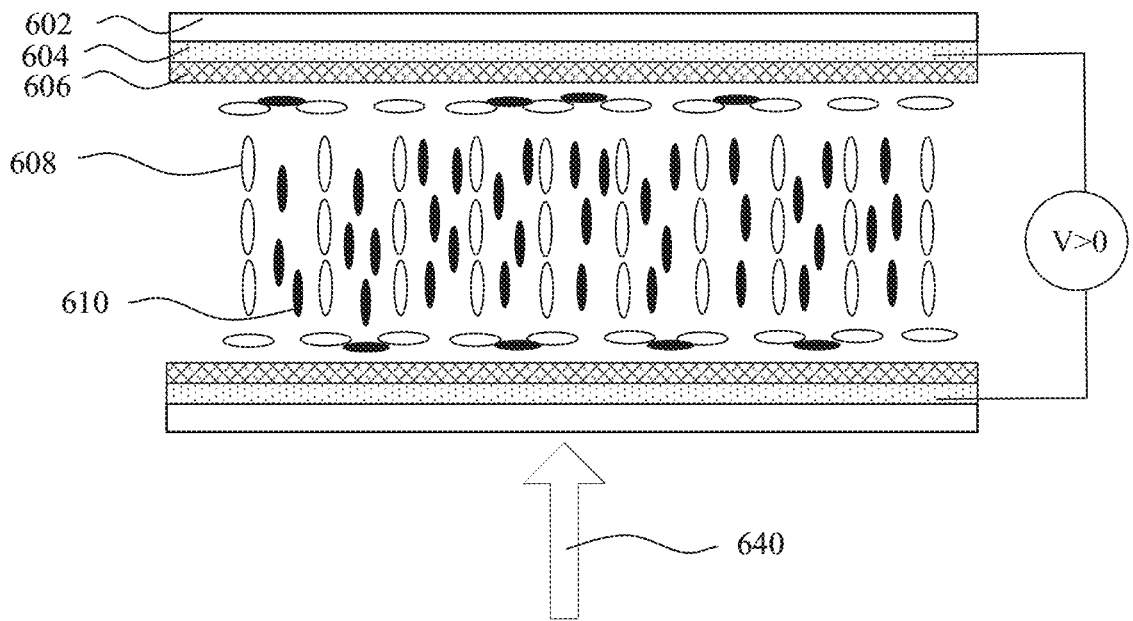

An example of LC shutters based on absorption is a guest-host LC shutter. FIGS. 6A-6B illustrates a schematic diagram of a guest-host LC shutter 600 according to an embodiment of the disclosure. As shown in FIG. 6A, the guest-host LC shutter 600 may include two opposite substrates 602 and an LC layer sandwiched between the two opposite substrates 602. Each substrate 602 may be provided with a transparent electrode 604 and an alignment layer 606. The LC layer may include a mixture of host LCs 608 and guest dichroic dyes 610 doped into the LCs 608. The dye molecules 610 may be aligned together with the LC molecules 608 in a voltage-off state, and reoriented with the LC molecules 608 under an applied electric field E in a voltage-on state. The absorption properties of a dye molecule 610 may depend on its orientation relative to the incident light 640. In some embodiments, when the absorption axes of the dye molecule 610 and the polarization direction of the incident light 640 are parallel, the dye molecule 610 may strongly absorb the incident light 640. On the contrary, the dye molecule 610 may weakly absorb the incident light 640 when the axes of the dye molecule 610 and the polarization direction of the incident light 640 are crossed with each other. Thus, through switching the orientation of the dye molecules 610 by an electric field, the incident light 640 may be absorbed or transmitted. Accordingly, the guest-host LC shutter 600 may be switched between an opaque state and a transparent state.

The LCs 608 in the LC layer may have positive or negative dielectric anisotropy. For illustrative purposes, FIGS. 6A-6B show the LCs 608 have positive dielectric anisotropy ($\Delta\varepsilon>0$). As shown in FIGS. 6A-6B, when the directors of the LCs 608 change from a planar orientation to a perpendicular orientation along with an applied voltage V, the long molecular axis of the dyes 610 may also change orientation along with the LCs 608, i.e., the dyes 610 may change from a planar orientation (a strong absorption state) at V=0 to a perpendicular orientation (a weak absorption state) at V≠0. Accordingly, the guest-host LC shutter 600 may be changed from an opaque state at V=0 to a transparent state at V≠0. In some embodiments, the LCs 608 may have negative dielectric anisotropy ($\Delta\varepsilon<0$), and the opaque state and the transparent state of the guest-host LC shutter 600 may be reversed, i.e., the guest-host LC shutter 600 may have a transparent state at V=0 and an opaque state at V≠0. The guest-host LC shutter 600 may be free of polarizers that absorb more than 50% of incident light. Also, the production cost of the guest-host LC shutter 600 may be significantly reduced. In addition, flexible substrates may be allowed to be used in the guest-host LC shutter, which may enable great design flexibility of the overall NED design.

Examples of LC shutters based on scattering may include a polymer dispersed liquid crystal (PDLC) shutter, a polymer network liquid crystal (PNLC) shutter, a filled LC shutter, etc. LC/polymer composites may appear in the form of network or droplet depending on the polymer and its concentration. In the low concentration regime of polymer (about 1-2 wt %), the response time may be significantly improved, however, the resulted light scattering may be very strong in the visible range. When the polymer concentration increases to about 3-8 wt %, the polymer network liquid crystal (PNLC, also known as gel) may be formed in a homogeneous or homeotropic cell which exhibits an anisotropic light scattering behavior. When the polymer concentration increases to 30-40 wt %, the polymer dispersed liquid crystal (PDLC) may be formed. Alignment layers may be no longer required in a PDLC cell. Micron-sized LC droplets are dispersed in the polymer matrix, in which visible light may be strongly scattered independently of polarization. In the high polymer concentration regime (about 60-70 wt %), nanoscale PDLC (nano-PDLC) may be formed. Because the LC droplet size is much smaller than the visible wavelength, nano-PDLC may be free of light scattering and its response time is fast (30-200 µs). However, to reorient LC molecules in such small droplets, a relatively high switching electric field may be desired. Alignment layers may be no longer required in a nano-PDLC cell.

Figure 7A:
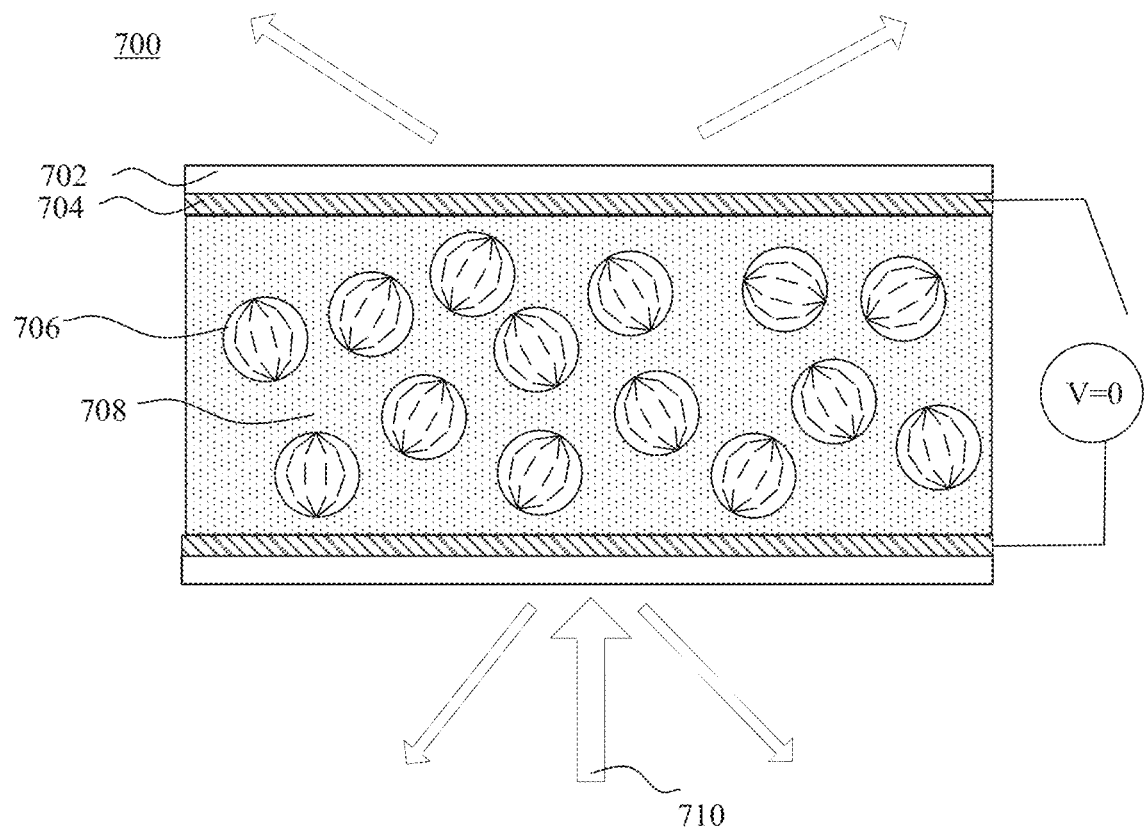
FIGS. 7A-7B illustrate a schematic diagram of another optical shutter based on scattering according to an embodiment of the disclosure.
Figure 7B:
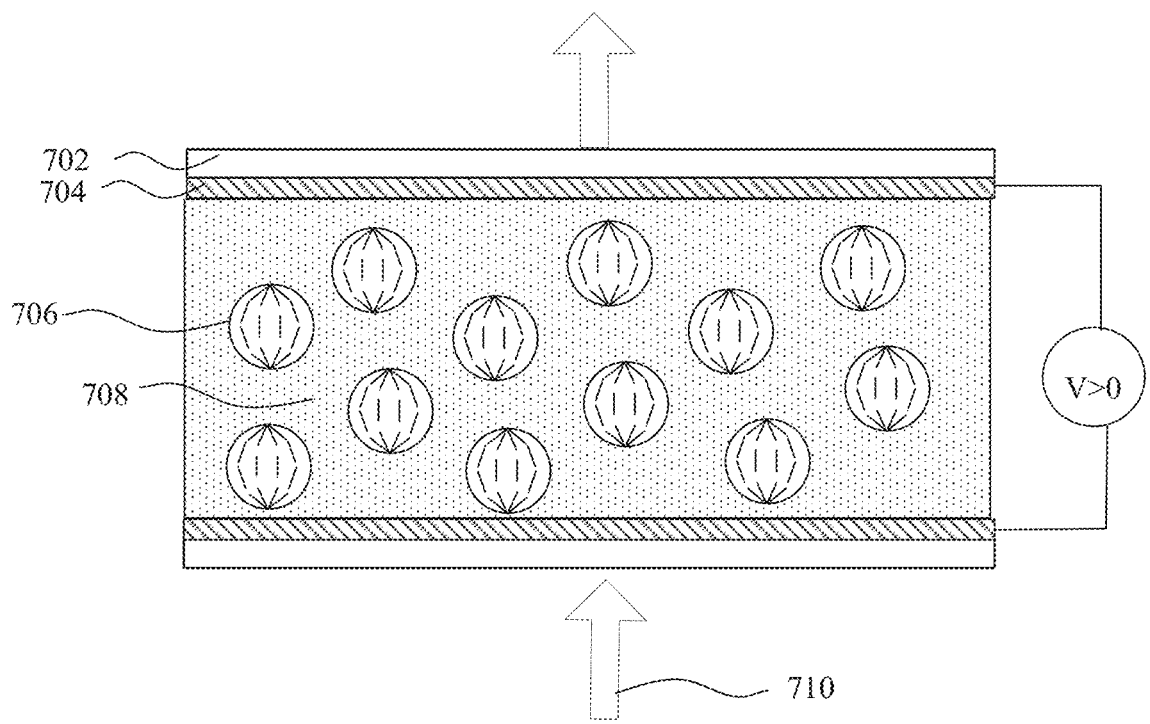

FIGS. 7A-7B illustrates a schematic diagram of a PDLC shutter 700 according to an embodiment of the disclosure. As shown in FIG. 7A, the PDLC shutter 700 may include two opposite substrates 702 and a PDLC layer sandwiched between the two substrates 702. Each substrate 702 may be provided with a transparent electrode 704, such as an ITO electrode, for applying a voltage to the PDLC layer. The PDLC layer may be a composite material layer that includes micro-sized nematic LC droplets 706 randomly dispersed in an optically isotropic polymer matrix 708. The LC droplets 706 each may have a bipolar configuration that exhibits a dielectric anisotropy. The PDLC may be obtained either by an encapsulation from the emulsion of LCs in a liquid or by a polymerization-induced phase separation process, for example, using photopolymerization or thermal polymerization. The ordinary refractive index $n_o$ of the LCs within the LC droplets 706 may be chosen to be sufficiently close to (including match) refractive index $n_p$ of the polymer matrix material. The PDLC shutter 700 may work without polarizers.

In a voltage-off state, as shown in FIG. 7A, the symmetry axis of each LC droplet 706 may be in general randomly oriented. The difference between the refractive index of the polymer matrix material and the effective refractive index of the LCs may result in the scattering of a substantially normally incident light 710, giving the PDLC shutter 700 a milky appearance. An opaque state of the PDLC shutter 700 may be realized. Note that the LC droplets 706 with diameter of the same order of wavelength of visible light may more efficiently scatter an incident visible light. In a voltage-on state, as shown in FIG. 7B, an electric field may be applied along the normal direction of the PDLC layer, the symmetry axis of the LC droplets 706 having LCs of positive dielectric anisotropy may be reoriented by the electric field, and trend to be parallel to the electric field direction. Because the ordinary refractive index $n_o$ of the LCs is sufficiently close to (or match) the refractive index $n_p$ of the polymer matrix material, the substantially normally incident light 710 may encounter negligible variation of refractive index. Thus, the incident light 710 may be transmitted through the PDLC layer with negligible scattering. A transparent state of the PDLC shutter 700 may be realized. Varying the strength of the applied electric field may allow the PDLC shutter 700 to be continuously tuned from opaque to almost transparent. After removal of the electric field, the anchoring force of the polymer on the LCs may restore the LC droplets 706 to the original orientation and again the PDLC shutter 700 may appear milky. Hence, the PDLC shutter 700 may be opaque in the voltage-off state and clear in the voltage-on state. In some embodiments, the PDLC shutter 700 may be opaque in the voltage-on state and clear in the voltage-off state.

A PNLC shutter may include a PNLC layer sandwiched between two opposite substrates. Each substrate may be provided with a transparent electrode, such as an ITO electrode, for applying a voltage to the PNLC layer. In some embodiments, the PNLC layer may include nematic LCs, and the operation principle of the PNLC shutter may be similar to the PDLC shutter, but have a reduced operating voltage due to the lower polymer concentration. The switching speed of the PNLC shutter may be further improved by using sheared PNLC, where the PNLC layer is subjected to a shearing force parallel to the substrates. The shearing force may orientate the polymer chains within the PNLC in the direction of the shearing movement. The resulting sheared PNLC shutter may have a switching speed of couple tens of microseconds. However, the PNLC shutter including nematic LCs may be still polarization sensitive, and alignment layers may be disposed at the internal surfaces of the substrates. The polarization independency of the PNLC shutter may be achieved by stacking the above two PNLC layers with orthogonal alignment directions or by forming PNLC structure in a 90° twisted nematic (TN) cell.

In some embodiments, the PNLC layer may include cholesteric LCs, where the pitch of the cholesteric LC may be a few micrometers (ms), and alignment layers may be no longer required. Polymerization of monomer in the cholesteric LC may occur when a high voltage is applied on the LC cell, which unwinds the cholesteric structure and reorients the cholesteric LC molecules to the homeotropic state (i.e., perpendicular to the substrate). The polymer network may be formed perpendicular to the substrate in the direction of homeotropically aligned cholesteric LCs under the high field. After polymerization, in a voltage-off state, the cholesteric LCs may tend to have a helical structure, while the polymer network may tend to keep the LC director parallel to the polymer network. The competition between the two factors may result in the focal conic texture. The PNLC layer may have a polydomain structure and may be optically scattering, realizing an opaque state of the PNLC shutter. In a voltage-on state, the LCs with positive dielectric anisotropy ($\Delta\varepsilon>0$) may be switched to the homeotropic texture, and the incident light may experience the ordinary reflective index $n_o$ of LCs which is matched with the refractive index $n_p$ of the polymer and, thus, may be not scattered but transmitted through the PNLC layer, realizing a transparent state of the PNLC shutter.

A filled LC shutter may include liquid crystal (LC)-colloidal nanoparticle (NP)-polymer (P) composites, which are formed by, for example, photoinduced phase separation. The nanoparticles may be used as filling materials for LCs. For PDLC filled with NPs, in the process of photoinduced phase separation of the LC-NP-prepolymer mixture, the nanoparticles may be mainly involved with the polymer, serving as building blocks for the polymer matrix. For an LC shutter including PDLC filled with NPs, when the aggregation rate of the nanoparticles is high or the size of the nanoparticles is large, the PDLC filled with NPs may have an enhanced light scattering as compared to pure PDLC. When the aggregation rate of nanoparticles is low, the nanoparticles may not influence the optical uniformity, but modify the refractive index of the polymer, which may modify the ratio of the refractive indices of LC drops and polymer matrix and, as a result, the scattering characteristics. Accordingly, the electro-optic contrast of the PDLC may be modified and, in particular, the off-axis haze of the PDLC, which is caused by the refractive index mismatch of the LC drops and the polymer matrix if they are matched for normal incident light ($n_p=n_o$), may be efficiently suppressed.

Figure 8A:
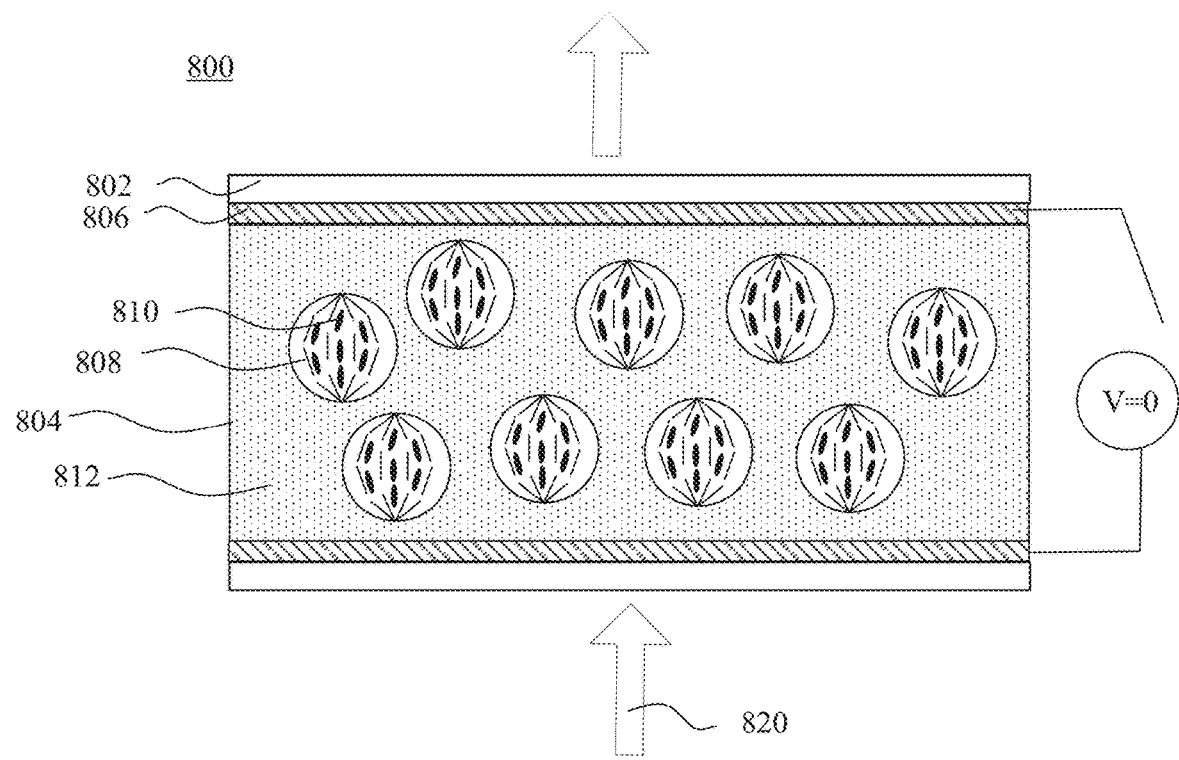
FIGS. 8A-8B illustrate a schematic diagram of another optical shutter based on scattering and absorption according to an embodiment of the disclosure.
Figure 8B:
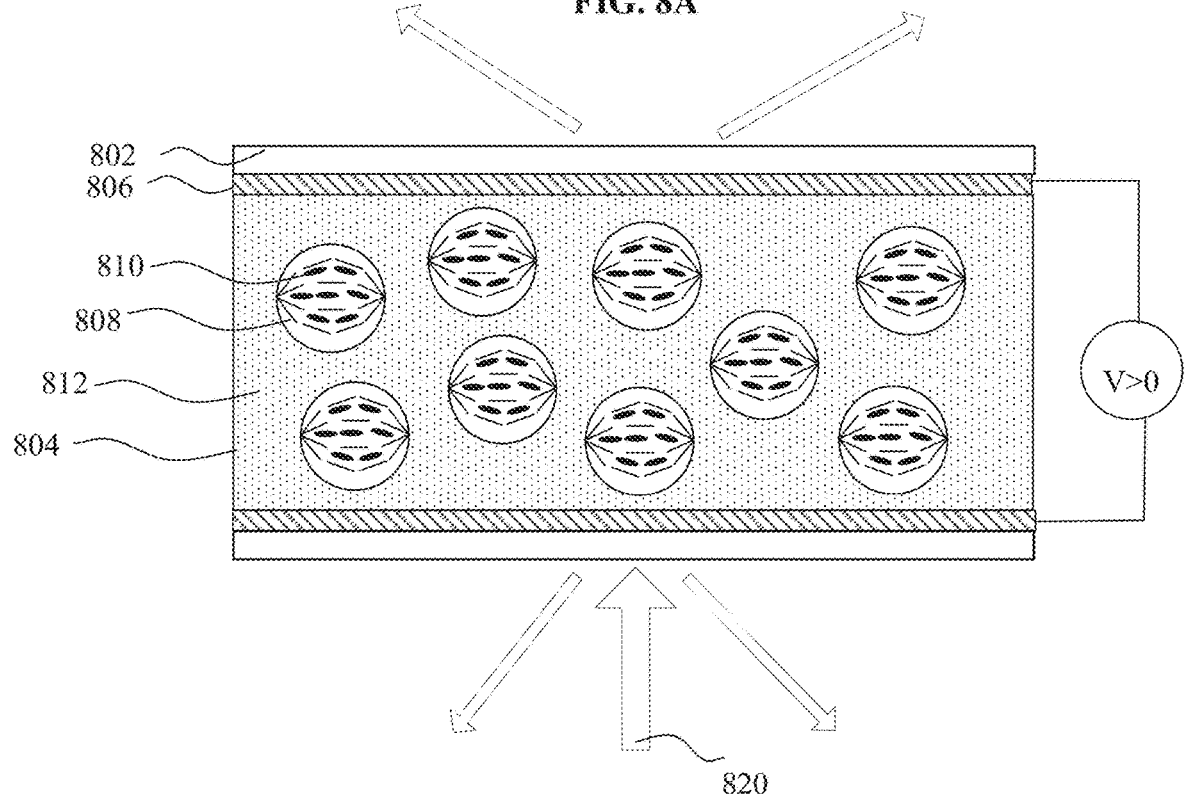

An LC shutter based on scattering and absorption may be a combination of an LC shutter based on scattering shown in FIGS. 7A-7B and an LC shutter based on absorption shown in FIGS. 6A-6B. FIGS. 8A-8B illustrate a schematic diagram of an LC shutter 800 based on scattering and absorption according to an embodiment of the disclosure. As shown in FIG. 8A, the LC shutter 800 may include two opposite substrates 802, and a composite layer 804 of PDLC (or PNLC) doped with dyes (e.g., dichroic dyes) sandwiched between the two substrates 802. Each substrate may be provided with a planar transparent electrode 806, e.g., an ITO electrode. Each electrode 806 may be provided with an alignment layer (not drawn), through which LC molecules 808 with negative dielectric anisotropy ($\Delta\varepsilon<0$) may be homeotropically (or vertically) aligned, and dye molecules 810 may align together with the LC molecules 808. The dye molecules 810 may have an absorption axis in the long axis.

In a voltage-off state, as shown in FIG. 8a, the LC molecules 808 and the dye molecules 810 may be vertically aligned on each substrate 802, and a substantially normally incident light 820 that is unpolarized may be weakly absorbed. On the other hand, because the ordinary refractive index $n_o$ of the LCs is sufficiently close to (or match) the refractive index $n_p$ of the polymer matrix material, the substantially normally incident light 820 may encounter negligible variation of refractive index. Thus, the incident light 820 may be transmitted through with negligible scattering. A transparent state of the LC shutter 800 may be realized.

In a voltage-on state, as shown in FIG. 8B, an electric field may be applied along the normal direction of the composite layer 804, the LC molecules 808 having negative dielectric anisotropy ($\Delta\varepsilon<0$) may be reoriented by the electric field to be parallel to the substrate 802. The orientation of the dye molecules 810 may also change along with the LC molecules 808, consequently, the absorption axis orientation of the dye molecules 810 may be changed, for example, from the weakly-absorbing/homeotropic orientation to the strongly-absorbing/homogeneous orientation. Accordingly, the incident light 820 may be strongly absorbed. On the other hand, the difference between the refractive index of the polymer matrix material and the effective refractive index of the LCs may result in the scattering of the incident light 820. Thus, an opaque state of the LC shutter 800 may be realized.

In the following, exemplary high-speed switchable LC gratings and polarization sensitive gratings will be presented. Examples of high-speed switchable LC gratings may include an H-PDLC grating, a surface relief grating filled with LCs, and an LC grating based on modulation of LC alignment, etc.

Figure 9A:
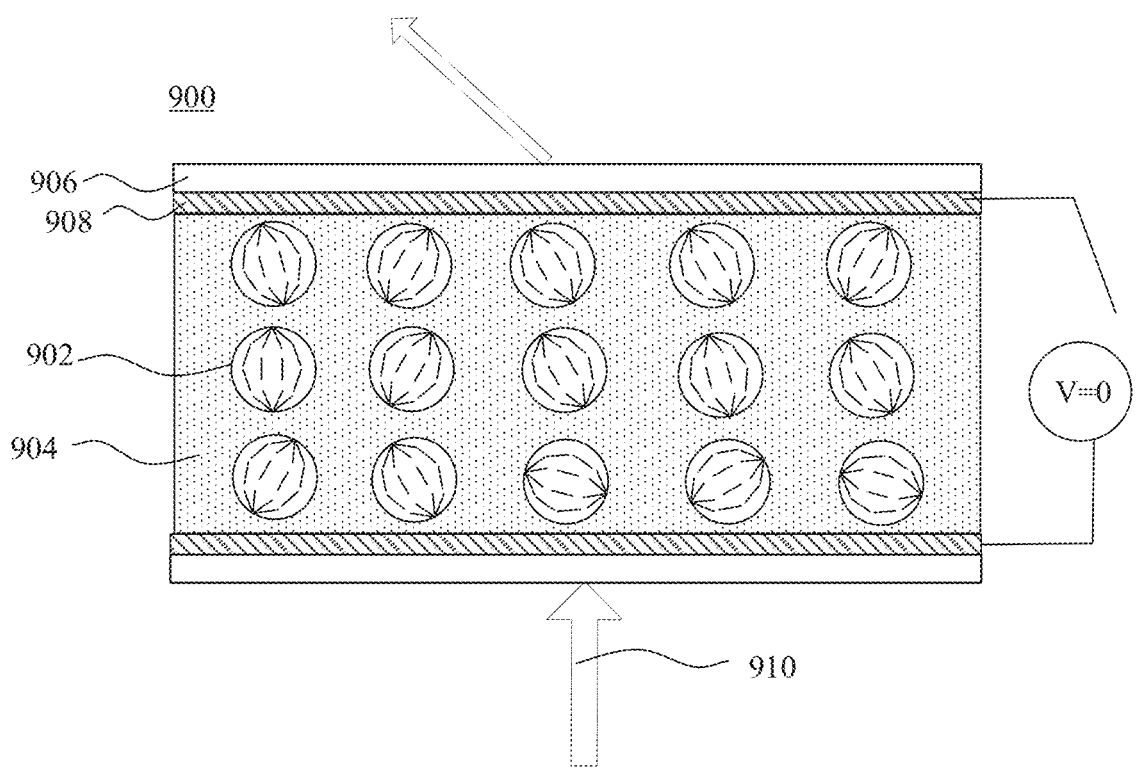
FIGS. 9A-9B illustrate a schematic diagram of a holographic polymer dispersed liquid crystal (H-PDLC) grating according to an embodiment of the disclosure.
Figure 9B:
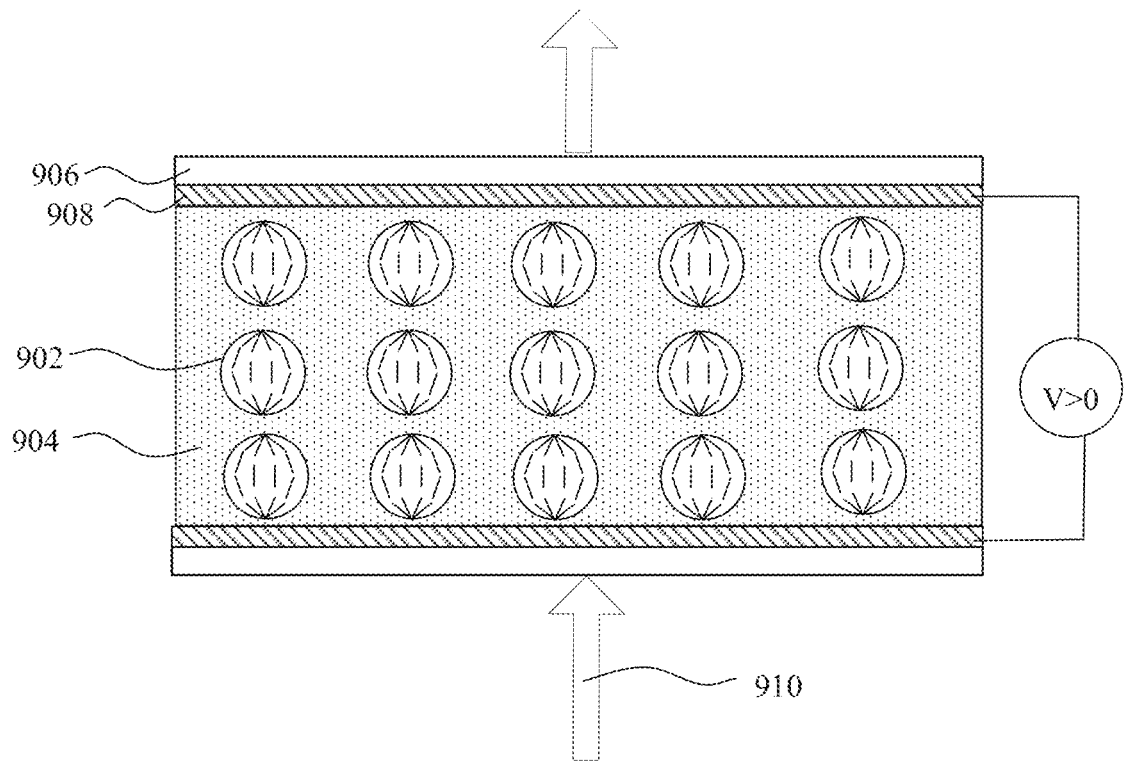

An H-PDLC grating may be fabricated by polymerizing an isotropic photosensitive liquid mixture of monomers and LCs under a laser interference irradiation. H-PDLC gratings include gratings with droplet structure of LC and layer structure of LC. FIGS. 9A-9B illustrate a schematic diagram of a droplet type H-PDLC grating 900 according to an embodiment of the disclosure. As shown in FIG. 9A, the H-PDLC grating 900 may include layers of randomly oriented or partially oriented nematic LC droplets 902 embedded in a polymer matrix 904 that is sandwiched between two substrates 906. Each substrate 906 may be provided with a transparent conductive electrode 908, such as an ITO electrode. The ordinary refractive index $n_o$ of the LCs within the LC droplets 902 may be chosen to be sufficiently close to the refractive index $n_p$ of the material of the polymer matrix 904. Because of the refractive index difference between the LC droplets 902 and material of the polymeric matrix 904, the spatial modulation of the LC content may produce a modulation in the average refractive index, resulting in an optical phase grating which diffracts a normally incident light 910. The LC droplets 902 in H-PDLC are usually very small (subwavelength size) so that scattering due to refractive index mismatch of the LC and polymer may be minimized, and only phase modulation may play a role. In other words, H-PDLC often belongs to class of nano-PDLC.

As shown in FIG. 9B, the resulting optical phase grating may be switched off by applying an external voltage, such that the droplet directors may be aligned along with the electric field direction. Because the ordinary refractive index $n_o$ of the LCs within the LC droplets 902 is chosen to be sufficiently close to the refractive index $n_p$ of the material of the polymer matrix 904, the normally incident light 910 may not experience a refractive index modulation and, thus, may be transmitted through with negligible diffraction.

Due to a high refractive index modulation, e.g., the refractive index modulation amplitude may be close to birefringence of the LCs, the H-PDLC grating 900 may have a substantially thin thickness of a few micrometers (ms) even in Bragg regime. The diffraction efficiency of the H-PDLC grating 900 may be close to about 80%. In some embodiments, the H-PDLC grating 900 may be polarization sensitive. The diffraction efficiency of the H-PDLC grating 900 may have polarization dependence because of partial alignment of the LCs in the H-PDLC grating 900. Depending on the materials used, either p-polarized light or s-polarized light may be strongly diffracted while the light with the other polarization may be negligibly diffracted.

For illustrative purposes, FIGS. 9A-9B shows the H-PDLC grating 900 is switchable by an external voltage, when the voltage is switched off, the H-PDLC grating 900 may exhibit the grating effect, and when the voltage is switched on, the grating effect may vanish. In some embodiments, the H-PDLC grating may be non-switchable. In this case, the substrates may not contain conductive electrodes.

No-droplet H-PDLC gratings may include Policryps (polymer-liquid-crystal-polymer-slices) and Poliphem (polymer-liquid crystal-polymer holograms electrically manageable) gratings. In both types of gratings, the LC droplet nucleation may be inhibited, so that their morphology may simply consist of alternate homogeneous films of polymer and LCs. Compared to most H-PDLC gratings, a higher refractive index modulation may be achieved in Policryps and Poliphem gratings and, thus, a higher diffraction efficiency may be obtained given the same grating thickness as the H-PDLC grating. In addition, the scattering loss of Policryps and Poliphem gratings may be strongly reduced, and the switching voltage may be much lower because the dimension of the LC domains is not fixed by the droplet size but by the grating spacing. However, Policryps and Poliphem gratings may have slower response time.

Figure 10A:
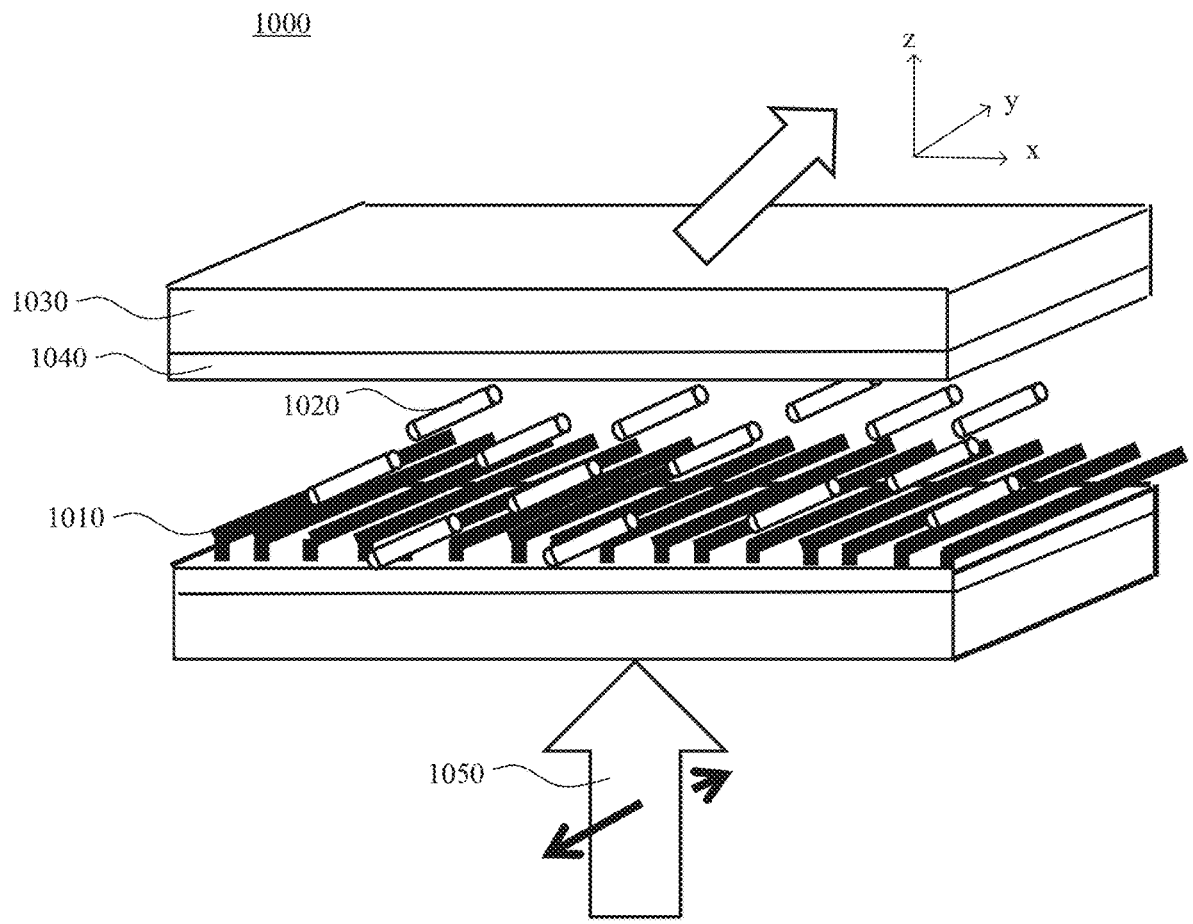
FIGS. 10A-10B illustrate a schematic diagram of a surface relief grating filled with liquid crystals according to an embodiment of the disclosure.
Figure 10B:
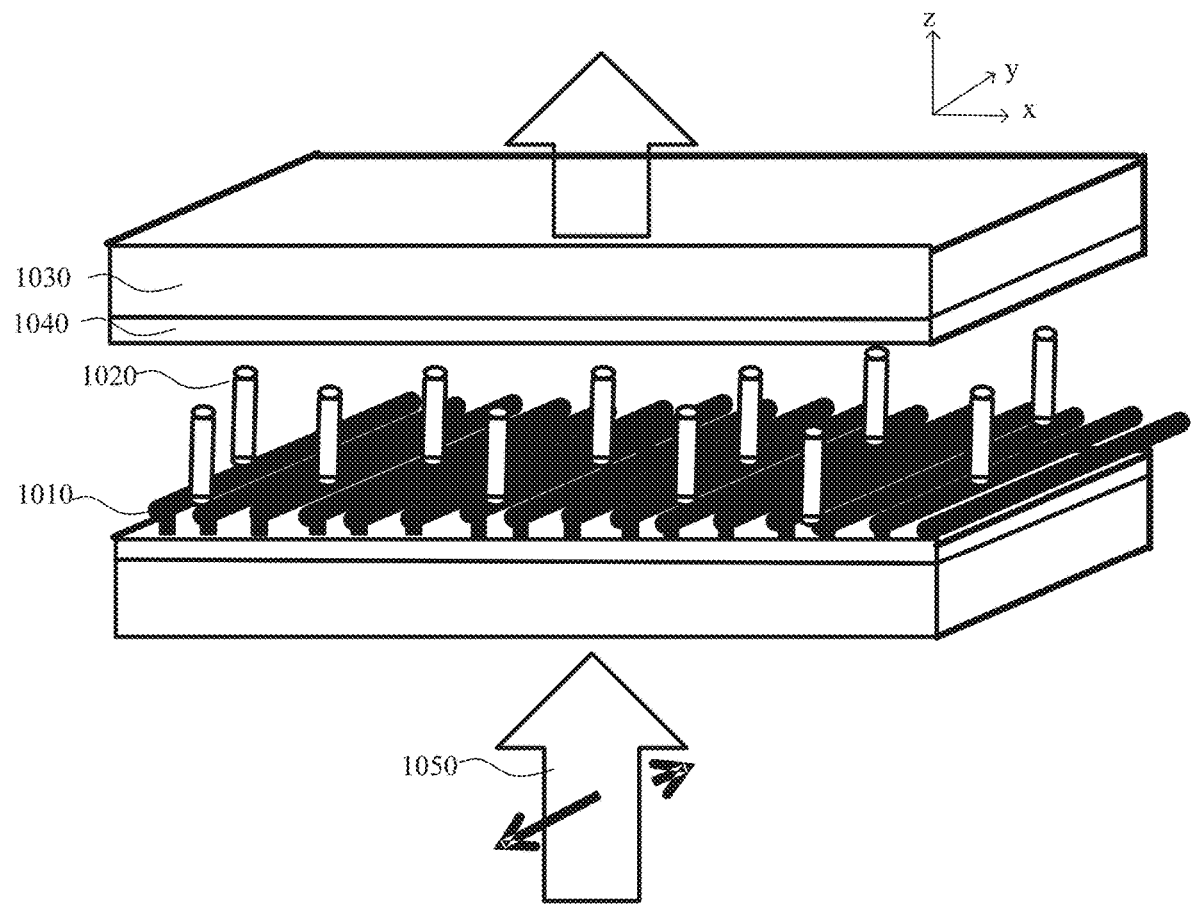

FIGS. 10A-10B illustrate a schematic diagram of a grating 1000 which is a surface relief grating filled with LCs. As shown in FIG. 10, the grating 1000 may be a surface relief grating (SRG) 1010 filled with LCs 1020, which is referred to as an LC filled SRG in the following description. The surface relief grating 1010 may be optically recorded in a photopolymer, for example, an acrylamide-based photopolymer. The LC filled SRG 1000 may have two opposite transparent substrates 1030 that sandwiches the surface relief grating 1010 and the filled LCs 1020. Each substrate 1030 may be provided with a transparent electrode (e.g., ITO electrode) 1040. The ordinary refractive index $n_o$ of the LCs 1020 may be configured to be sufficiently close to the refractive index $n_p$ of the polymer material of the SRG 1010. The surface relief grating 1010 may align the LCs 1020 in a certain direction. In one embodiment, as shown in FIG. 10A, the LCs 1020 may have a homogeneous alignment in the direction of grating grooves, e.g., in the direction of y-axis.

The LC grating 1000 may be sensitive to linear polarization and may be switchable. At a voltage-off state, as shown in FIG. 10A, due to the refractive index difference between the homogeneously aligned LCs 1020 and the photopolymer of the surface relief grating 1010 (i.e., the refractive index difference between $n_o$ and $n_p$), a periodic modulation of the refractive index may be realized in the LC filled SRG 1000. In some embodiments, an s-polarized incident light 1050 incident on the LC filled SRG 1000 may be diffracted, realizing an on-state of the LC filled SRG 1000. At a voltage-on state, as shown in FIG. 10B, with the application of an electric field, the LCs 1020 may be aligned along with the electric field direction (e.g., in the z-axis), such that the refractive index of LCs 1020 matches the refractive index of photopolymer of the surface relief grating 1010. In this state, the periodic modulation of the refractive index in the LC filled SRG 1000 may vanish, and the s-polarized incident light 1050 may be directly transmitted, realizing an off-state of the LC filled SRG 1000. In particular, the diffraction efficiency of the LC filled SRG 1000 may be controlled by varying the applied electric field, and only the reorientation of LCs 1020 within the LC filled SRG grating 1000 may affect the diffraction efficiency. A p-polarized incident light may not be diffracted when the LC filled SRG 1000 in the on-state or off-state, because the p-polarized incident light always sees the ordinary refractive index $n_o$ of the LCs 1020 that is matched with the photopolymer. In other words, the LC filled SRG 1000 may appear as a uniform transparent plate to the p-polarized incident light.

For illustrative purposes, FIGS. 10A-10B shows the LC filled SRG 1000 is switchable by an external voltage. When the voltage is switched off, the LC filled SRG 1000 may exhibit the grating effect, and when the voltage is switched on, the grating effect may vanish. In some embodiments, the LC filled SRG 1000 may be non-switchable, for example, when the substrates are not provided with the electrodes.

The grating effect in LC layers may also be caused by the modulation of the LC alignment. To switch the LC grating between an on-state and an off-state in a fast speed, fast LC modes, such as FLC mode, Pi-cell mode, dual-frequency nematic mode, etc., may be highly desired. In some embodiments, the modulation of the LC alignment may be realized by an electric field, such as using striped electrodes, pixelated electrodes. In some embodiments, the modulation of the LC alignment may be realized by modulation of anchoring conditions of the LCs, for example, in-plane modulation of easy axis of LCs, modulation of pretilt angle of LCs.

The present discourse also provides a method for a waveguide display assembly. FIG. 11 illustrates a flow chart of a method for a waveguide display assembly according to an embodiment of the disclosure. As shown in FIG. 11, the method may include during a virtual-world subframe of a display frame of a projector, switching on the projector to generate an image light and switching at least one switchable grating to a diffracting state to decouple the image light out of a waveguide to an eye-box via diffraction (S1110). The method may further include during a real-world subframe of the display frame, switching off the projector from generating the image light and switching the at least one switchable grating to a non-diffracting state having a diffraction efficiency lower than a predetermined threshold (S1120). In some embodiments, the at least one switchable grating may be an out-coupling grating.

In some embodiments, the method may further include during the virtual-world subframe of the display frame, switching all switchable gratings to perform at least one of directing, expanding or decoupling the image light out of the waveguide to the eye-box via the diffraction; and during the real-world subframe of the display frame, switching all the switchable gratings to transmit the light from the real-world environment to the eye-box with the diffraction efficiency less than the predetermined threshold. In some embodiments, all switchable gratings may include one or more out-coupling gratings, one or more fold gratings, one or more pupil expansion gratings, and any other gratings disposed in the optical path of the light from the real-world environment towards the eye-box.

In some embodiments, the method may further include during the real-world subframe, switching an optical shutter disposed in front of the projector to an opaque state to block the image light from being incident onto the waveguide; and during the virtual-world subframe, switching the switchable optical shutter to a transparent state to transmit the image light to be incident onto the waveguide. A switching time of the switchable optical shutter is sufficiently fast such that the real-world and virtual-world subframes are switched for the time and presented at a rate that exceeds a flicker fusion threshold of the user, i.e., beyond a flicker fusion threshold.

In some embodiments, the method may further include during the real-world subframe, switching a high speed optical dimmer disposed opposite to the outcoupling grating to a transparent state to transmit the light from the real-world environment to be incident onto the waveguide; and during the virtual-world subframe, switching the dimmer to an opaque state that dims the light from the real-world environment from being incident onto the waveguide. In some embodiments, the dimmer may be switched to the transparent state to transmit the real-world light during the real-world subframe, and switched to the opaque state to dim (including completely block) the real-world light during the virtual-world subframe. The dark background in case of see-though attenuation may increase contrast of virtual images demonstrated in this subframe. When the virtual-world subframe is configured to last for 10% of the total frame period, the see-through artifacts may be almost eliminated at the expense of a 10% reduction of the see-through brightness. In some embodiments, the dimmer may adaptively dim an incident light, i.e., the dimmer may function as a controllable dimming element rather than a shutting element with only two transmittance states. The attenuation provided by the dimmer may be controlled by, for example, an external electric field, a magnetic field, or light or some combination thereof.

The foregoing description of the embodiments of the disclosure have been presented for the purpose of illustration. It is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An optical device, comprising:
   a source assembly configured to generate an image light;
   a waveguide optically coupled with the source assembly and configured to guide the image light to an eye-box;
   an in-coupling element configured to couple the image light into the waveguide;
   an out-coupling element including a plurality of switchable out-coupling gratings; and
   a controller configured to control each of the plurality of switchable out-coupling gratings to operate in a diffraction state to decouple the image light out of the waveguide during a virtual-world subframe of a display frame, and to operate in a non-diffraction state during a real-world subframe of the display frame to, transmit a light from a real-world environment to the eye-box with a diffraction efficiency of less than about 0.5%.

2. The optical device according to claim 1, wherein the controller is configured to control each of the plurality of switchable out-coupling gratings to operate in the non-diffraction state to transmit the light from the real-world environment to the eye-box with the diffraction efficiency of greater than about 0.1% and less than about 0.5%.

3. The optical device according to claim 1, further comprising:
   a switchable directing element, wherein the controller is configured to control the switchable directing element, together with each of the plurality of switchable out-coupling gratings, to:
      during the virtual-world subframe of the display frame, operate in the diffraction state to direct the image light to the out-coupling element, and
      during the real-world subframe of the display frame, operate in the non-diffraction state to transmit the light from the real-world environment to the eye-box with the diffraction efficiency of less than about 0.5%.

4. The optical device according to claim 1, wherein the real-world subframe has a longer duration than the virtual-world subframe.

5. The optical device according to claim 4, wherein the real-world subframe lasts for about 90% to 99% of time of the display frame.

6. The optical device according to claim 1, wherein the real-world and virtual-world subframes are presented at a rate that exceeds a flicker fusion threshold.

7. The optical device according to claim 1, wherein the plurality of switchable out-coupling gratings include a switchable liquid crystal grating.

8. The optical device according to claim 1, wherein the source assembly includes a high-speed projector, and the controller is configured to switch on the high-speed projector during the virtual-world subframe and switch off the high speed projector during the real-world subframe, the high-speed projector having a sufficiently short switching time such that the real-world and virtual-world subframes are presented at a rate that exceeds a flicker fusion threshold.

9. The optical device according to claim 8, wherein the high-speed projector includes one of a DLP (digital light processing) projector, an LCoS (liquid crystal on silicon) projector, an LCD (liquid crystal display) projector, an OLED (organic light-emitting diode) projector, or a micro-LED (light-emitting diode) projector.

10. The optical device according to claim 1, wherein the source assembly includes a light source, and the controller is configured to switch on the light source during the virtual-world subframe and switch off the light source during the real-world subframe, the light source having a sufficiently short switching time such that the real-world and virtual-world subframes are presented at a rate that exceeds a flicker fusion threshold.

11. The optical device according to claim 1, wherein the source assembly includes a projector and a switchable optical shutter disposed in front of the projector, and the controller is configured to control the switchable optical shutter to:
   during the real-world subframe, block the image light output from the projector from being incident onto the waveguide, and
   during the virtual-world subframe, transmit the image light output from the projector to be incident onto the waveguide.

12. The optical device according to claim 11, wherein the switchable optical shutter has a sufficiently short switching time such that the real-world and virtual-world subframes are presented at a rate that exceeds a flicker fusion threshold.

13. The optical device according to claim 1, wherein the in-coupling element includes at least one switchable in-coupling grating, and the controller is configured to control the at least one switchable in-coupling grating, together with each of the plurality of switchable out-coupling gratings, to switch between operating in the diffraction state during the virtual-world subframe to couple the image light into the waveguide, and operating in the non-diffraction state during the real-world subframe to not couple the image light into the waveguide.

14. A method, comprising:
   controlling, during a virtual-world subframe of a display frame of a source assembly included in an optical device, each of a plurality of switchable out-coupling gratings included in an out-coupling element to operate in a diffraction state to decouple an image light out of a waveguide included in the optical device to an eye-box; and controlling, during a real-world subframe of the display frame, each of the plurality of switchable out-coupling gratings to operate in a non-diffraction state to transmit a light from a real-world environment to the eye-box with a diffraction efficiency of less than about 0.5%.

15. The method according to claim 14, further comprising:

controlling, during the virtual-world subframe of the display frame, a directing element included in the optical device to operate in the diffraction state to direcct the image light to the out-coupling element; and controlling, during the real-world subframe of the display frame, the directing element to operate in the non-diffraction state to transmit the light from the real-world environment to the eye-box with the diffraction efficiency of less than about 0.5%.

16. The method according to claim 14, wherein controlling, during the real-world subframe, each of the plurality of switchable out-coupling gratings to operate in the non-diffraction state to transmit the light from the real-world environment to the eye-box with the diffraction efficiency of less than about 0.5% comprises:

controlling, during the real world subframe, each of the plurality of switchable out-coupling gratings to operate in the non-diffraction state to transmit the light from the real-world environment to the eye-box with the different efficieny of greater than about 0.1% and less than about 0.5%.

17. The method according to claim 14, wherein the real-world subframe has a longer duration than the virtual-world subframe.

18. The method according to claim 14, wherein a switching speed of each of the plurality of switchable out-coupling gratings is sufficiently fast such that the real-world and virtual-world subframes are presented at a rate that exceeds a flicker fusion threshold.

19. The method according to claim 14, wherein the source assembly includes a projector and a switchable optical shutter disposed in front of the projector, and the method further comprises:

controlling, during the real-world subframe, the switchable optical shutter to block the image light from being incident onto the waveguide; and controlling, during the virtual-world subframe, the switchable optical shutter to transmit the image light to be incident onto the waveguide, wherein a switching time of the switchable optical shutter is sufficiently fast such that the real-world and virtual-world subframes are presented at a rate that exceeds a flicker fusion threshold.

20. The method according to claim 14, further comprising:

controlling at least one switchable in-coupling grating together with each of the plurality of switchable out-coupling gratings to switch between operating in the diffraction state during the virtual-world subframe to couple the image light into the waveguide, and operating in the non-diffraction state during the real-world subframe to not couple the image light into the waveguide.

* * * * *